US012663579B2

(12) United States Patent
Song et al.

(10) Patent No.: US 12,663,579 B2
(45) Date of Patent: Jun. 23, 2026

(54) PHOTONIC DEVICE, SYSTEM AND METHOD OF MAKING SAME

(71) Applicant: Taiwan Semiconductor Manufacturing Co., Ltd., Hsinchu City (TW)

(72) Inventors: Weiwei Song, San Jose, CA (US); Stefan Rusu, Sunnyvale, CA (US)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 18/434,636

(22) Filed: Feb. 6, 2024

(65) Prior Publication Data

US 2024/0219626 A1      Jul. 4, 2024

Related U.S. Application Data

(63) Continuation of application No. 17/836,879, filed on Jun. 9, 2022, now Pat. No. 11,899,240.

(51) Int. Cl.
*G02B 6/12* (2006.01)
*G02B 6/122* (2006.01)
(Continued)

(52) U.S. Cl.
CPC ......... *G02B 6/12002* (2013.01); *G02B 6/122* (2013.01); *G02B 6/13* (2013.01); *G02B 2006/12061* (2013.01); *G06N 3/067* (2013.01)

(58) Field of Classification Search
CPC ......... G02B 6/12; G02B 6/12002; G02B 6/13
See application file for complete search history.

(56) References Cited

U.S. PATENT DOCUMENTS 3,785,717 A      1/1974   Croset et al.
5,159,699 A      10/1992  de Monts
(Continued)

FOREIGN PATENT DOCUMENTS

CN      110824612 A   *   2/2020
CN      111683304 A       9/2020
(Continued)

OTHER PUBLICATIONS

N. Sherwood-Droz et al. Scalable 3D dense integration of photonics on bulk silicon. Optics Express, 19:18: 17758-17765, Aug. 29, 2011. (https://doi.org/10.1364/OE.19.017758) (Year: 2011).
(Continued)

*Primary Examiner* — Michael Stahl
(74) *Attorney, Agent, or Firm* — Hauptman Ham, LLP

(57)      ABSTRACT

Photonic device, system and methods of making photonic devices and systems, the method including: providing a substrate, forming an insulator layer over the substrate, depositing a plurality of waveguide layers and a plurality of insulator spacers at different vertical levels over the insulator layer, wherein adjacent waveguide layers in the plurality of waveguide layers are isolated by one or more insulator spacers in the plurality of insulator spacers, and forming a plurality of waveguide patterns at the plurality of waveguide layers, wherein at least two waveguide patterns at different vertical levels in the plurality of waveguide patterns are coupled.

20 Claims, 13 Drawing Sheets

(51) Int. Cl.
    *G02B 6/13*     (2006.01)
    *G06N 3/067*     (2006.01)

(56)           References Cited

U.S. PATENT DOCUMENTS

| | | | |
|---|---|---|---|
| 6,411,765 B1 | 6/2002 | Ono | |
| 7,103,252 B2 | 9/2006 | Ide | |
| 11,675,126 B1 | 6/2023 | Kodigala et al. | |
| 2014/0264400 A1 | 9/2014 | Lipson et al. | |
| 2016/0356960 A1* | 12/2016 | Novack | G02B 6/1228 |
| 2016/0377806 A1 | 12/2016 | Ellis-Monaghan et al. | |
| 2017/0139142 A1 | 5/2017 | Patel et al. | |
| 2020/0166720 A1* | 5/2020 | Charles | G02B 6/4245 |
| 2020/0241209 A1 | 7/2020 | Park et al. | |
| 2021/0064958 A1 | 3/2021 | Lin et al. | |
| 2021/0184774 A1 | 6/2021 | Zhou et al. | |
| 2022/0146751 A1 | 5/2022 | Bian | |
| 2022/0343149 A1 | 10/2022 | Su et al. | |
| 2023/0161120 A1* | 5/2023 | Yu | G02B 6/43 |
| | | | 385/14 |
| 2023/0204875 A1* | 6/2023 | Horth | G02B 6/12004 |
| | | | 385/14 |
| 2023/0314706 A1* | 10/2023 | Bian | G02B 6/12002 |
| | | | 385/14 |
| 2024/0266801 A1* | 8/2024 | Voigt | H01S 5/141 |

FOREIGN PATENT DOCUMENTS

| | | |
|---|---|---|
| JP | 2004317687 A | 11/2004 |
| TW | 201831938 A | 9/2018 |
| TW | 202213710 A | 4/2022 |
| TW | 202221578 A | 6/2022 |

OTHER PUBLICATIONS

Y. Hara et al. Compact branched optical waveguides using high-index-contrast stacked structure. Optical Review, 10:5:357-360, Sep. 2003. (https://doi.org/10.1007/s10043-003-0357-4) (Year: 2003).

Y. Huang et al. CMOS compatible monolithic multi-layer Si3N4-on-SOI platform for low-loss high performance silicon photonics dense integration. Optics Express, 22:18:21859-21865, Sep. 8, 2014. (https://doi.org/10.1364/OE.22.021859) (Year: 2014).

J. Bessette et al. Vertically stacked microring waveguides for coupling between multiple photonic planes. Optics Express, 21:11: 13580-13591, Jun. 3, 2013. (https://doi.org/10.1364/OE.21.013580) (Year: 2013).

J. Chiles et al. Multi-planar amorphous silicon photonics with compact interplanar couplers, cross talk mitigation, and low cross-ing loss. APL Photonics, 2: 116101, Oct. 11, 2017. (https://doi.org/10.1063/1.5000384) (Year: 2017).

J. Chiles et al. Design, fabrication, and metrology of 10×100 multi-planar integrated photonic routing manifolds for neural networks. APL Photonics, 3:106101, Jul. 26, 2018. (https://doi.org/10.1063/1.5039641) (Year: 2018).

S. Xu et al. Optical tensor core architecture for neural network training based on dual-layer waveguide topology and homodyne detection. Chinese Optics Letters, 19:8:082501, Aug. 2021. (https://doi.org/10.3788/COL.202119.082501) (Year: 2021).

* cited by examiner 1330
1320
1310
1300

1320
1430a
1430m
1310

PHOTONIC DEVICE, SYSTEM AND METHOD OF MAKING SAME

CROSS-REFERENCE TO RELATED APPLICATION

This application is a continuation application of U.S. patent application Ser. No. 17/836,879, filed Jun. 9, 2022, now U.S. Pat. No. 11,899,240, issued Feb. 13, 2024, the contents of which is incorporated by reference herein in its entirety.

BACKGROUND

A photonic integrated circuit is a device that integrates multiple photonic functions and as such is similar to an electronic integrated circuit. A photonic integrated circuit provides functions for information signals imposed on optical wavelengths typically in the visible spectrum or near infrared. Unlike electronic integration where silicon is the dominant material, photonic integrated circuits have been fabricated from a variety of material systems, including electro-optic crystals, silica on silicon, silicon on insulator, various polymers and/or semiconductor materials which are used to make semiconductor lasers.

Optical computing utilizes manipulation of visible or infrared light to perform computation processes rather than manipulation of electric current used by electronic computing. In general, since electric current signals propagate at a lower speed than the speed of light, optical computing enables faster computation rates when compared to electronic systems. In the development of novel photonic processing units for optical computing, for example, a photonic neural network (PNN), multiple processing layers are needed. The conventional way to implement a PNN device is to create a feedback loop to reuse the photonic network or create a multi-layer network on one photonic layer. This approach is inefficient, expensive, limited in computation density, and power hungry. Therefore, prior methods and systems of implementing PNNs were not entirely satisfactory.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
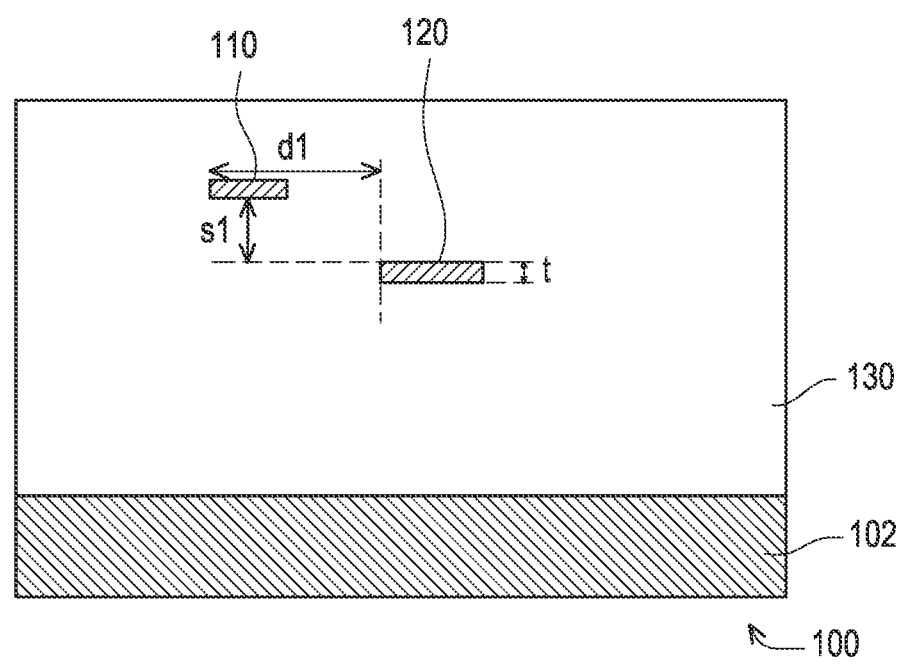
FIG. 1 illustrates a schematic cross-sectional view of a photonic device according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Intensive effort and progress has been seen in the development of photonic integrated circuits in silicon-on-insulator (SOI) substrates. Using silicon (Si) to make photonic devices has many advantages. For example, Si waveguides can monolithically integrate with optically active devices, e.g., electro-optic modulators and germanium (Ge) photodetectors (PD). High refractive index contrast between Si and silicon dioxide ($SiO_2$) enables manufacturability of densely integrated electronic-photonic components at low costs and high volumes. Si also has good thermal conductivity, which makes it suitable to fabricate thermally tunable photonic devices. However, for passive optical components, silicon nitride waveguides can be superior to Si waveguides in terms of less thermo-optic effects, greatly reduced optical nonlinearities, high transparency in the visible wavelength range, and low index contrast.

Examples of passive optimal components include optical connectors, directional couplers (DCs), splitters, optical attenuators, isolators, filters, switches, optical add/drop multiplexers, and/or any other components. Conventional passive optimal components are based on SOI or silicon nitride platforms and are fabricated on a single device layer which typically has a planar device structure.

In the example of a DC, optical power can be exchanged and transmitted between two waveguides fabricated on a single device layer. Typical design parameters of a DC include coupling length, gap, waveguide widths, and/or any other parameters. Power splitting ratio at the output ports of a DC can be determined by the design parameters with an input light wave phase. In conventional optical DC implementations, optical power can only be exchanged between two waveguides from the same photonic layer. In the development of novel photonic processing units, for example, of a photonic neural network (PNN), multiple processing layers are typically needed. The conventional way to implement the PNN is to create a feedback loop for reusing the photonic network or to create a multi-layer network on a single photonic layer. This approach is inefficient, expensive, power hungry, and limited in computation density.

In accordance with some embodiments, the disclosure provides a method for forming a photonic device by forming a plurality of waveguide layers vertically stacked over a substrate. In some embodiments, the method comprises forming a vertical DC based on multiple photonic layers at different vertical levels. In the vertical DC, optical power can be exchanged between different photonic layers. In this way, a 3D PNN can be realized using the vertical DCs. Among other benefits, such a photonic device provides: reduced chip-size and fabrication cost, higher fabrication tolerance, more controllable material thickness, possibility of exchanging power between different layers in a 3D network, and enhanced computation density.

FIG. 1 illustrates a cross-sectional side view of a photonic device 100 according to an embodiment of the present disclosure. This diagram is merely an example, which should not unduly limit the scope of the claims. As shown in this embodiment, waveguides 110 and 120 are formed within a silicon oxide layer 130 formed over a substrate 102 (e.g., a silicon-on-insulator (SOI) substrate). While the substrate 102 provides mechanical support during manufacturing, it is not required for the optical functionality and may be removed. The waveguide 110 is formed vertically above and horizontally offset from the waveguide 120, with a vertical distance between a bottom surface of the waveguide 110 and a top surface of the waveguide 120 being shown as "s1" and a horizontal distance between a left edge of the waveguide 110 and a left edge of the waveguide 120 being shown as "d1." In some embodiments, "d1" is zero, meaning the waveguides overlap. In this case the coupling between the two waveguides will be very strong and may require an increase in the vertical separation "s1". Each of the waveguides 110 and 120 may have a vertical thickness between a top surface and a bottom surface of the same waveguide. An example of a vertical thickness t for the waveguide 120 is illustrated in FIG. 1. Note that the thickness of the two waveguides may be different. As used herein, the term "waveguide" refers to a physical structure that guides electromagnetic waves. Examples of a waveguide include a silicon nitride (SiN) waveguide, a silicon waveguide, a polymer waveguide, and/or any other types of waveguides. In some embodiments, the waveguides 110 and 120 form a first optical DC used to couple optical signals, as described in further detail below.

Figure 2:
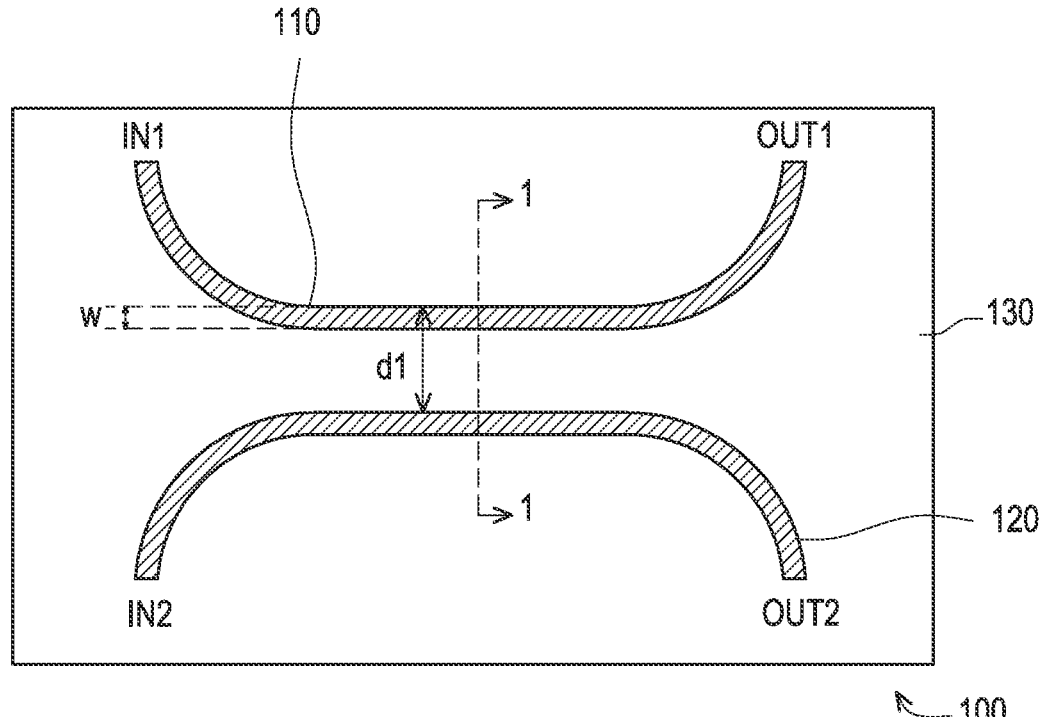
FIG. 2 illustrates a top-view of the photonic device illustrated in FIG. 1, according to an embodiment of the present disclosure.

FIG. 2 illustrates a top-view of the photonic device 100 illustrated in FIG. 1, according to an embodiment of the present disclosure. It should be noted that the cross sectional view illustrated in FIG. 1 is taken along dashed line 1-1 of FIG. 2. Each of the waveguides 110 and 120 may have a horizontal width between two side surfaces of the same waveguide. An example of a horizontal width w for the waveguide 110 is illustrated in FIG. 2. As can be seen, the first optical DC may be formed by the waveguides 110 and 120 with two input ports IN1 and IN2, and two output ports OUT1 and OUT2. In some examples, a fractional part (for example α, α<1) of power from IN1 port is passed through OUT1 port and a remaining part of 1−α is taken out from OUT2. When a light source (not shown) is provided at input port IN1, a portion (α) of the energy of the transmitted light is transmitted through the first waveguide 110 to output port OUT1, while a remaining portion (1−α) is optically coupled to the second waveguide 120 and transmitted to output port OUT2 through the silicon oxide layer 130 and the second waveguide 120. In some other examples, if a light source is provided at input port IN2, a fractional part (for example β, β<1) of power from IN2 port is passed through OUT2 port and a remaining part of 1−β is taken out from OUT1. When a light source (not shown) is provided at input port IN2, a portion (β) of the energy of the transmitted light is transmitted through the second waveguide 120 to output port OUT2, while a remaining portion (1−β) is optically coupled to the first waveguide 110 and transmitted to output port OUT1 through the silicon oxide layer 130 and the first waveguide 110. In this way, the input ports IN1 and IN2 can have mutual coupling where a fractional part (α) of the power from IN1 port is passed through OUT1 port and a remaining part (1−α) is taken out from OUT2, while a fractional part (β) of the power from IN2 port is passed through OUT2 port and a remaining part (1−β) is taken out from OUT1. In some examples, the first optical DC comprises a set of characteristic parameters. Examples of characteristic parameters include a coupling ratio, excess loss, insertion loss, directivity, and/or any other parameters. In some embodiments, the characteristic parameters of the first optical DC are determined based on at least in part the vertical distance s1 and the horizontal distance d1, which impact the optical coupling characteristics between the waveguides 110 and 120, respectively. In accordance with various embodiments, s1 can be in the range of 100 nanometers to 10 micrometers, d1 can be in the range of zero to 1 millimeter, t can be in the range of 100 nanometers to 1 millimeter, and w can be in the range of 100 nanometers to 100 micrometers.

In some embodiments, the waveguides 110 and 120 comprise SiN waveguides. The SiN waveguides may be formed on multiple layers of the silicon oxide layer 130 formed over the SOI substrate 102 using low-pressure chemical vapor deposition (LPCVD), plasma-enhanced chemical vapor deposition (PECVD), or any other deposition methods. The multiple layers of the silicon oxide layer 130 on which the SiN waveguides are formed may be considered as a single layer as illustrated by the silicon oxide layer 130 in FIG. 1, although the multiple layers of the silicon oxide layer 130, and any waveguides and/or other structures in each layer, may be formed at different deposition steps. LPCVD may be referred to as a chemical vapor deposition process that uses heat to initiate a reaction of a precursor gas on the solid substrate. LPCVD may use a front-end-of-line (FEOL) high-temperature deposition process that requires a temperature of about 800° C., resulting in a stoichiometric silicon nitride such as $Si_3N_4$. The PECVD may be referred to as a chemical vapor deposition process used to deposit thin films from a gas state (vapor) to a solid state on a substrate. In some examples, the PECVD is carried out at a temperature less than 400° C., and is thus typically a back end of line compatible process, but does not result in a stoichiometric silicon nitride. In some embodiments, the vertical distance between two vertically stacked SiN waveguides can be accurately formed through deposition, for example. As a result, optical DCs formed with two or more vertically stacked SiN waveguides may have improved characteristic parameter values as compared to optical DCs formed with waveguides from the same planar layer. In some other embodiment, one of the waveguides 110 or 120 may be silicon and the other may be silicon nitride.

Figure 3:
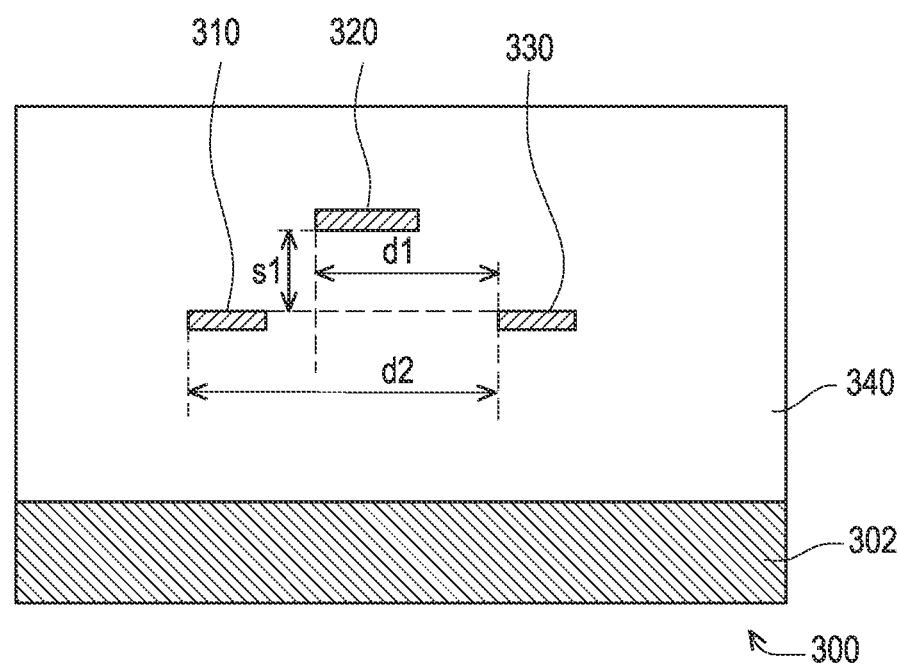
FIG. 3 illustrates a schematic cross-sectional view of another photonic device, according to an embodiment of the present disclosure.

FIG. 3 illustrates a cross-sectional side view of a photonic device 300, according to an embodiment of the present disclosure. As shown in this embodiment, waveguides 310, 320 and 330 are formed within a silicon oxide layer 340 formed over a substrate 302 (e.g., a silicon-on-insulator (SOI) substrate). While the substrate 302 provides mechanical support during manufacturing, it is not required for the optical functionality and may be removed. The waveguide 320 is formed vertically above and horizontally offset from the waveguides 310 and 330, respectively. Top surfaces of the waveguides 310 and 330 are at a same vertical level and a vertical distance between a bottom surface of the waveguide 320 and the top surfaces of the waveguides 310 and 330 is shown as "s1". A horizontal distance between a left edge of the waveguide 320 and a left edge of the waveguide 330 is shown as "d1", and a horizontal distance between a left edge of the waveguide 310 and the left edge of the waveguide 330 is shown as "d2". In some embodiments, the waveguides 320 and 330 form a first optical DC, and the waveguides 310 and 330 form a second optical DC, as described in further detail below.

Figure 4:
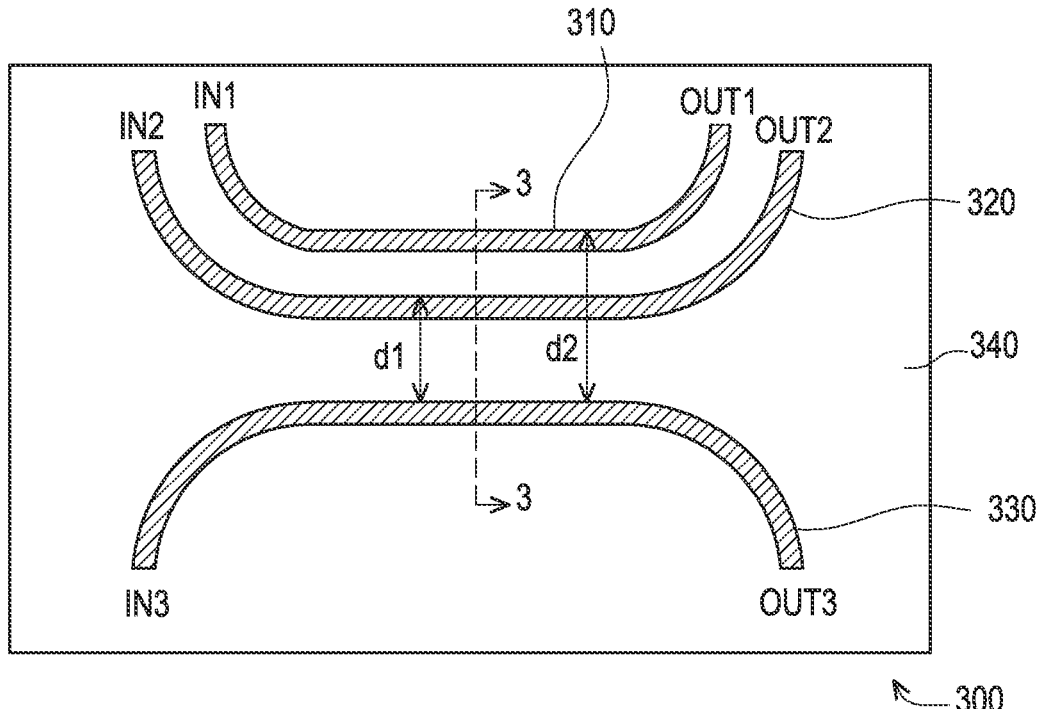
FIG. 4 illustrates a top-view of the photonic device illustrated in FIG. 3, according to an embodiment of the present disclosure.

FIG. 4 illustrates a top-view of the photonic device 300 illustrated in FIG. 3, according to an embodiment of the present disclosure. It should be noted that the cross sectional view illustrated in FIG. 3 is taken along dashed line 3-3 of FIG. 4. As can be seen, the first optical DC may be formed by the waveguides 320 and 330 with two input ports: IN2 and IN3, and two output ports: OUT2 and OUT3. The second optical DC may be formed by the waveguides 310 and 330 with two input ports: IN1 and IN3, and two output ports: OUT1 and OUT3.

In one example, a first fractional part (for example α, α<1) of power from IN3 port is passed through OUT3 port, a second fractional part (for example β, α+β<1) of power from IN3 port is passed through OUT2 port due to the first optical DC, and a remaining part of 1−α−β of power from IN3 port is passed through OUT1 port due to the second optical DC. When a light source (not shown) is provided at input port IN3, a first portion (α) of the energy of the transmitted light is transmitted through the waveguide 330 to output port OUT3, while a second portion (β) is optically coupled to the waveguide 320 and transmitted through the silicon oxide layer 340 and then through the waveguide 320 to output port OUT2, and a remaining portion (1−α−β) is optically coupled to the waveguide 310 and transmitted through the silicon oxide layer 340 and then through the waveguide 310 to output port OUT1.

In another example, a fractional part (for example α', α'<1) of power from IN2 port is passed through OUT2 port and a remaining part of 1−α' is taken out from OUT1. When a light source (not shown) is provided at input port IN2, a portion (α') of the energy of the transmitted light is transmitted through the waveguide 320 to output port OUT2, while a remaining portion (1−α') is optically coupled to the waveguide 330 and transmitted through the silicon oxide layer 340 and then through the waveguide 330 to output port OUT3.

In yet another example, a fractional part (for example α", α"<1) of power from IN1 port is passed through OUT1 port and a remaining part of 1−α" is taken out from OUT3. When a light source (not shown) is provided at input port IN1, a portion (α") of the energy of the transmitted light is transmitted through the waveguide 310 to output port OUT1, while a remaining portion (1−α") is optically coupled to the waveguide 330 and transmitted through the silicon oxide layer 340 and then through the waveguide 330 to output port OUT3. In some examples, the first optical DC comprises a set of characteristic parameters determined based on at least in part the vertical distances s1 and the horizontal distance d1, which impact the optical coupling characteristics of the first optical DC, and the second optical DC comprises a set of characteristic parameters determined based on at least in part the vertical distances s1 and the horizontal distance d2, which impact the optical coupling characteristics of the second optical DC. In accordance with various embodiments, s1 can be in the range of 100 nanometers to 10 micrometers, d1 can be in the range of zero to 1 millimeter, and d2 can be in the range of zero to 1 millimeter.

In some embodiments, the waveguides 310, 320 and 330 comprise SiN waveguides. The SiN waveguides may be formed on multiple layers of the silicon oxide layer 340 formed over the SOI substrate 302 using LPCVD, PECVD, or any other suitable deposition methods. The multiple layers of the silicon oxide layer 340 on which the SiN waveguides are formed may be considered as a single layer as illustrated by the silicon oxide layer 340 in FIG. 3, although the multiple layers of the silicon oxide layer 340, including any structures formed therein, may be formed in different deposition steps. The LPCVD may use a FEOL high-temperature deposition process that requires a temperature of about 800° C., resulting in a stoichiometric silicon nitride such as $Si_3N_4$. In some examples, the PECVD is carried out at a temperature less than 400° C., and is thus typically a back end of line compatible process, but does not result in a stoichiometric silicon nitride. In some embodiments, the vertical distance between two vertically stacked SiN waveguides can be accurately formed through deposition, for example. As a result, optical DCs formed with two or more vertically stacked SiN waveguides may have improved characteristic parameter values as compared to optical DCs formed with waveguides from the same planar layer.

Figure 5:
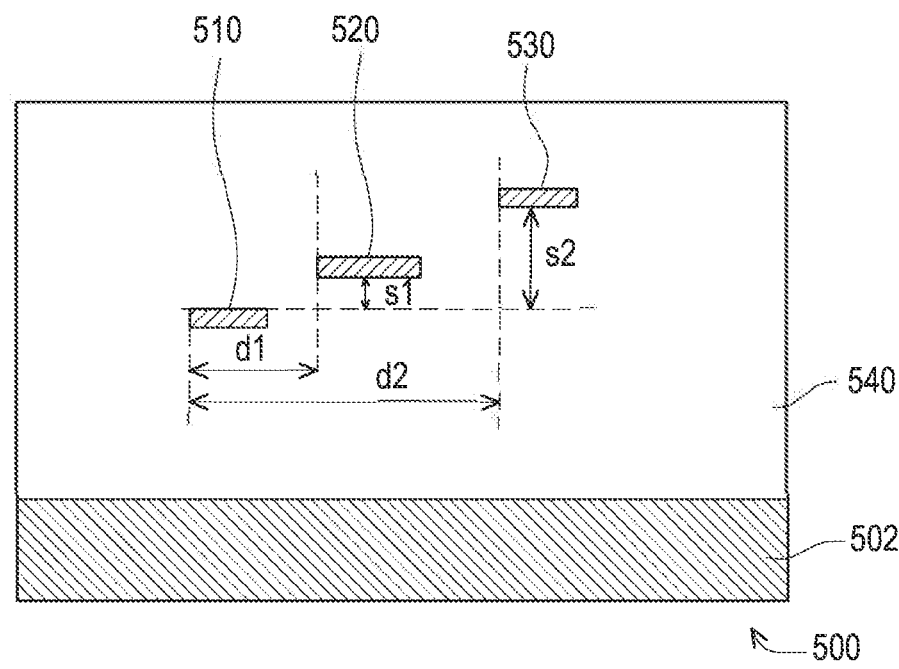
FIG. 5 illustrates a schematic cross-sectional view of yet another photonic device, according to an embodiment of the present disclosure.

FIG. 5 illustrates a cross-sectional side view of a photonic device 500, according to an embodiment of the present disclosure. As shown in this embodiment, waveguides 510, 520 and 530 are formed within a silicon oxide layer 540 formed over a substrate 502 (e.g., a silicon-on-insulator (SOI) substrate). While the substrate 502 provides mechanical support during manufacturing, it is not required for the optical functionality and may be removed. The waveguide 520 is formed vertically above and horizontally offset from the waveguide 510, and the waveguide 530 is formed vertically above and horizontally offset from the waveguide 520. A vertical distance between a bottom surface of the waveguide 520 and a top surface of the waveguide 510 is shown as "s1", and a vertical distance between a bottom surface of the waveguide 530 and the top surface of the waveguide 510 is shown as "s2". A horizontal distance between a left edge of the waveguide 510 and a left edge of the waveguide 520 is shown as "d1", and a horizontal distance between the left edge of the waveguide 510 and a left edge of the waveguide 530 is shown as "d2". In some embodiments, the waveguides 510 and 520 form a first optical DC, and the waveguides 510 and 530 form a second optical DC, as described in further detail below.

Figure 6:
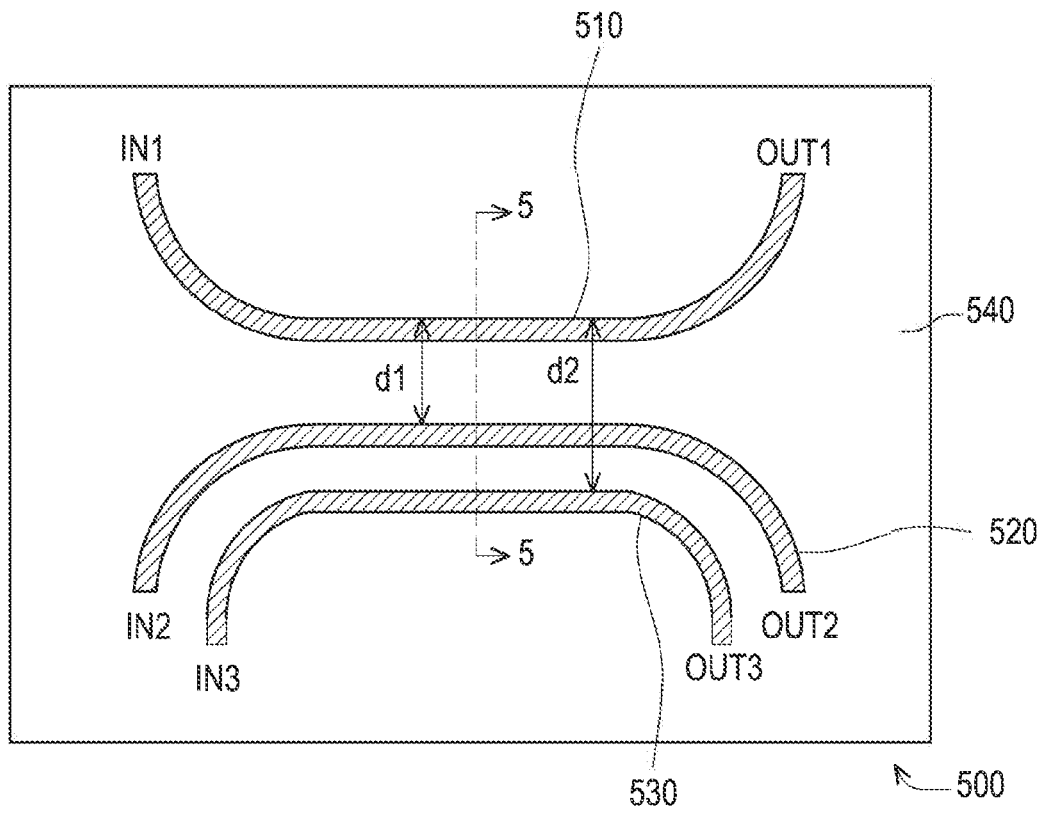
FIG. 6 illustrates a top-view of the photonic device illustrated in FIG. 5, according to an embodiment of the present disclosure.

FIG. 6 illustrates a top-view of the photonic device 500 illustrated in FIG. 5, according to an embodiment of the present disclosure. It should be noted that the cross sectional view illustrated in FIG. 5 is taken along dashed line 5-5 of FIG. 6. As can be seen, the first optical DC may be formed by the waveguides 510 and 520 with two input ports: IN1 and IN2, and two output ports: OUT1 and OUT2, and the second optical DC may be formed by the waveguides 510 and 530 with two input ports: IN1 and IN3, and two output ports: OUT1 and OUT3.

In one example, a first fractional part (for example α, α<1) of power from IN1 port is passed through OUT1 port, a second fractional part (for example β, α+β<1) of power from IN1 port is passed through OUT2 port due to the first optical DC, and a remaining part of 1−α−β of power from IN1 port is passed through OUT3 port due to the second optical DC. When a light source (not shown) is provided at input port IN1, a first portion (α) of the energy of the transmitted light is transmitted through the waveguide 510 to output port OUT1, a second portion (β) is optically coupled to the waveguide 520 and transmitted through the silicon oxide layer 540 and then through the waveguide 520 to output port OUT2, and a remaining portion (1−α−β) is optically coupled to the waveguide 530 and transmitted through the silicon oxide layer 540 and then through the waveguide 530 to output port OUT3.

In another example, a fractional part (for example α', α'<1) of power from IN2 port is passed through OUT2 port and a remaining part of 1−α' is taken out from OUT1. When a light source (not shown) is provided at input port IN2, a portion (α') of the energy of the transmitted light is transmitted through the waveguide 520 to output port OUT2, while a remaining portion (1−α') is optically coupled to the waveguide 510 and transmitted through the silicon oxide layer 540 and then through the waveguide 510 to output port OUT1.

In yet another example, a fractional part (for example α", α"<1) of power from IN3 port is passed through OUT3 port and a remaining part of 1−α" is taken out from OUT1. When a light source (not shown) is provided at input port IN3, a portion (α") of the energy of the transmitted light is transmitted through the waveguide 530 to output port OUT3, while a remaining portion (1−α") is optically coupled to the waveguide 510 and transmitted through the silicon oxide layer 540 and then through the waveguide 510 to output port OUT1. In some examples, the first optical DC comprises a set of characteristic parameters determined based on at least in part the vertical distances s1 and the horizontal distance d1, which impact the optical coupling characteristics of the first optical DC, while the second optical DC comprises a set of characteristic parameters determined based on at least in part the vertical distances s2 and the horizontal distance d2, which impact the optical coupling characteristics of the second optical DC. In accordance with various embodiments, s1 can be in the range of 100 nanometers to 10 micrometers, d1 can be in the range of zero to 1 millimeter, and d2 can be in the range of zero to 1 millimeter.

In some embodiments, the waveguides 510, 520 and 530 comprise SiN waveguides. The SiN waveguides may be formed on multiple layers of the silicon oxide layer 540 formed over the SOI substrate 502 using LPCVD, PECVD, or any other deposition methods. The multiple layers of the silicon oxide layer 540 on which the SiN waveguides are formed may be considered as a single layer as illustrated by the silicon oxide layer 540 in FIG. 5, although the multiple layers of the silicon oxide layer 540 can be formed in different deposition steps. The LPCVD may use a FEOL high-temperature deposition process that requires a temperature of about 800° C., resulting in a stoichiometric silicon nitride such as $Si_3N_4$. In some examples, the PECVD is carried out at a temperature less than 400° C., and is thus typically a back end of line compatible process, but does not result in a stoichiometric silicon nitride. In some embodiments, the vertical distance between two vertically stacked SiN waveguides can be accurately formed through deposition, for example. As a result, optical DCs formed with two or more vertically stacked SiN waveguides may have improved characteristic parameter values as compared to optical DCs formed with waveguides from the same planar layer.

Figure 7:
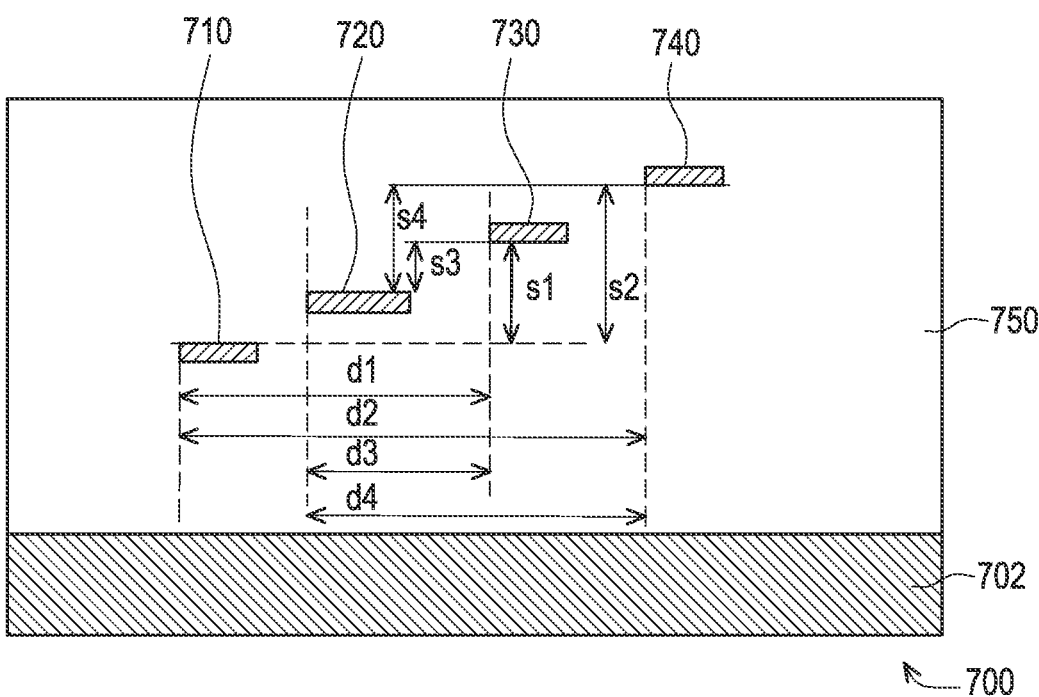
FIG. 7 illustrates a schematic cross-sectional view of still another photonic device, according to an embodiment of the present disclosure.

FIG. 7 illustrates a cross-sectional side view of a photonic device 700, according to an embodiment of the present disclosure. As shown in this embodiment, waveguides 710, 720, 730 and 740 are formed at different levels within a silicon oxide layer 750 formed over a substrate 702 (e.g., a silicon-on-insulator (SOI) substrate). While the substrate 702 provides mechanical support during manufacturing, it is not required for the optical functionality and may be removed. The waveguide 720 is formed vertically above and horizontally offset from the waveguide 710, waveguide 730 is formed vertically above and horizontally offset from the waveguide 720, and the waveguide 740 is formed vertically above and horizontally offset from the waveguide 730.

A vertical distance between a bottom surface of the waveguide 730 and a top surface of the waveguide 710 is shown as "s1", a vertical distance between a bottom surface of the waveguide 740 and the top surface of the waveguide 710 is shown as "s2", a vertical distance between the bottom surface of the waveguide 730 and a top surface of the waveguide 720 is shown as "s3", and a vertical distance between the bottom surface of the waveguide 740 and the top surface of the waveguide 720 is shown as "s4". A horizontal distance between a left edge of the waveguide 710 and a left edge of the waveguide 730 is shown as "d1", a horizontal distance between the left edge of the waveguide 710 and a left edge of the waveguide 740 is shown as "d2", a horizontal distance between a left edge of the waveguide 720 and the left edge of the waveguide 730 is shown as "d3", and a horizontal distance between the left edge of the waveguide 720 and the left edge of the waveguide 740 is shown as "d4". In some embodiments, the waveguides 710 and 730 form a first optical DC, the waveguides 710 and 740 form a second optical DC, the waveguides 720 and 730 form a third optical DC, and the waveguides 720 and 740 form a fourth optical DC, as described in further detail below. In accordance with various embodiments, s1 can be in the range of 100 nanometers to 10 micrometers, s2 can be in the range of 100 nanometers to 10 micrometers, s3 can be in the range of 100 nanometers to 10 micrometers, s4 can be in the range of 100 nanometers to 10 micrometers, d1 can be in the range of zero to 1 millimeter, d2 can be in the range of zero to 1 millimeter, d3 can be in the range of zero to 1 millimeter, and d4 can be in the range of zero to 1 millimeter.

Figure 8:
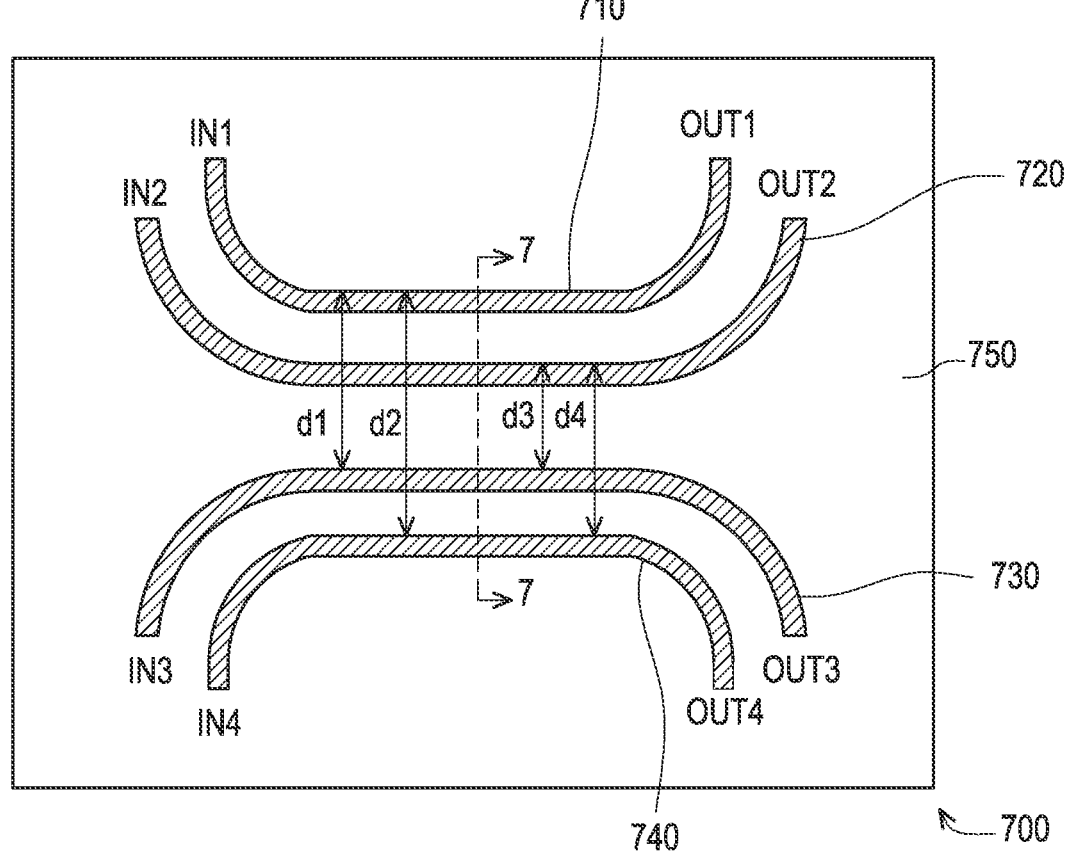
FIG. 8 illustrates a top-view of the photonic device illustrated in FIG. 7, according to an embodiment of the present disclosure.

FIG. 8 illustrates a top-view of the photonic device 700 illustrated in FIG. 7, according to an embodiment of the present disclosure. It should be noted that the cross sectional view illustrated in FIG. 7 is taken along dashed line 7-7 of FIG. 8. As can be seen, the first optical DC may be formed by the waveguides 710 and 730 with two input ports: IN1 and IN3, and two output ports: OUT1 and OUT3, the second optical DC may be formed by the waveguides 710 and 740 with two input ports: IN1 and IN4, and two output ports: OUT1 and OUT4, the third optical DC may be formed by the waveguides 720 and 730 with two input ports: IN2 and IN3, and two output ports: OUT2 and OUT3, and the fourth optical DC may be formed by the waveguides 720 and 740 with two input ports: IN2 and IN4, and two output ports: OUT2 and OUT4.

In one example, a first fractional part (for example $\alpha$, $\alpha<1$) of power from IN1 port is passed through OUT1 port, a second fractional part (for example $\beta$, $\alpha+\beta<1$) of power from IN1 port is passed through OUT3 port due to the first optical DC, and a remaining part $1-\alpha-\beta$ of power from IN1 port is passed through OUT4 port due to the second optical DC. When a light source (not shown) is provided at input port IN1, a first portion ($\alpha$) of the energy of the transmitted light is transmitted through the waveguide 710 to output port OUT1, while a second portion ($\beta$) is optically coupled to the waveguide 730 and transmitted through the silicon oxide layer 750 and then through the waveguide 730 to output port OUT3, and a remaining portion $(1-\alpha-\beta)$ is optically coupled to the waveguide 740 and transmitted through the silicon oxide layer 750 and then through the waveguide 740 to output port OUT4.

In another example, a first fractional part (for example $\alpha'$, $\alpha'<1$) of power from IN2 port is passed through OUT2 port, a second fractional part (for example $\beta'$, $\alpha'+\beta'<1$) of power from IN2 port is passed through OUT3 port due to the third optical DC, and a remaining part of $1-\alpha'-\beta'$ of power from IN2 port is passed through OUT4 port due to the fourth optical DC. When a light source (not shown) is provided at input port IN2, a first portion ($\alpha'$) of the energy of the transmitted light is transmitted through the waveguide 720 to output port OUT2, a second portion ($\beta'$) is optically coupled to the waveguide 730 and transmitted through the silicon oxide layer 750 and then through the waveguide 730 to output port OUT3, and a remaining portion $(1-\alpha'-\beta')$ is optically coupled to the waveguide 740 and transmitted through the silicon oxide layer 750 and then through the waveguide 740 to output port OUT4.

In yet another example, a first fractional part (for example $\alpha''$, $\alpha''<1$) of power from IN3 port is passed through OUT3 port, a second fractional part (for example $\beta''$, $\alpha''+\beta''<1$) of power from IN3 port is passed through OUT2 port due to the third optical DC, and a remaining part of $1-\alpha''-\beta''$ of power from IN3 port is passed through OUT1 port due to the first optical DC. When a light source (not shown) is provided at input port IN3, a first portion ($\alpha''$) of the energy of the transmitted light is transmitted through the waveguide 730 to output port OUT3, a second portion ($\beta''$) is optically coupled to the waveguide 720 and transmitted through the silicon oxide layer 750 and then through the waveguide 720 to output port OUT2, and a remaining portion $(1-\alpha''-\beta'')$ is optically coupled to the waveguide 710 and transmitted through the silicon oxide layer 750 and then through the waveguide 710 to output port OUT1.

In still another example, a first fractional part (for example $\alpha'''$, $\alpha'''<1$) of power from IN4 port is passed through OUT4 port, a second fractional part (for example $\beta'''$, $\alpha'''+\beta'''<1$) of power from IN4 port is passed through OUT2 port due to the fourth optical DC, and a remaining part of $1-\alpha'''-\beta'''$ of power from IN4 port is passed through OUT1 port due to the second optical DC. When a light source (not shown) is provided at input port IN4, a first portion ($\alpha'''$) of the energy of the transmitted light is transmitted through the waveguide 740 to output port OUT4, a second portion ($\beta'''$) is optically coupled to the waveguide 720 and transmitted through the silicon oxide layer 750 and then through the waveguide 720 to output port OUT2, and a remaining portion $(1-\alpha'''-\beta''')$ is optically coupled to the waveguide 710 and transmitted through the silicon oxide layer 750 and then through the waveguide 710 to output port OUT1.

In some embodiments, the waveguides 710, 720, 730 and 740 comprise SiN waveguides. The SiN waveguides may be formed on multiple layers of the silicon oxide layer 750 formed over the SOI substrate 702 using LPCVD, PECVD, or any other deposition methods. The multiple layers of the silicon oxide layer 750 on which the SiN waveguides are formed may be considered as a single layer as illustrated by the silicon oxide layer 750 in FIG. 7, although the multiple layers of the silicon oxide layer 750 can be formed in different deposition steps. The LPCVD may use a FEOL high-temperature deposition process that requires a temperature of about 800° C., resulting in a stoichiometric silicon nitride such as $Si_3N_4$. In some examples, the PECVD is carried out at a temperature less than 400° C., and is thus typically a back end of line compatible process, but does not result in a stoichiometric silicon nitride. In some embodiments, the vertical distance between two vertically stacked SiN waveguides can be accurately formed through deposition, for example. As a result, optical DCs formed with two or more vertically stacked SiN waveguides may have improved characteristic parameter values as compared to optical DCs formed with waveguides from the same planar layer.

Figure 9:
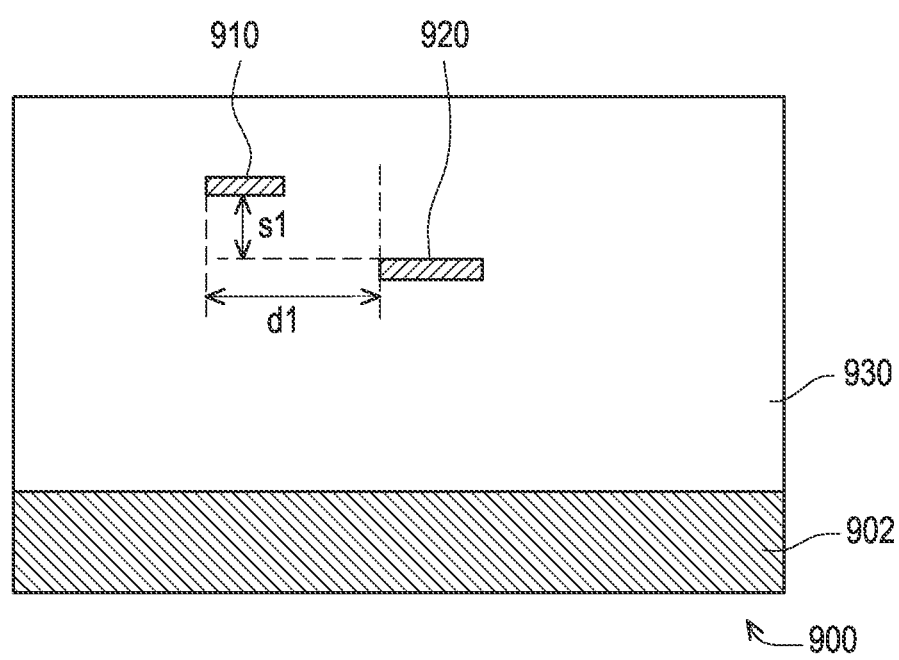
FIG. 9 illustrates a schematic cross-sectional view of still another photonic device, according to an embodiment of the present disclosure.

FIG. 9 illustrates a cross-sectional side view of a photonic device 900, according to an embodiment of the present disclosure. As shown in this embodiment, waveguides 910 and 920 are formed within a silicon oxide layer 930 formed over a substrate 902 (e.g., a silicon-on-insulator (SOI) substrate). While the substrate 902 provides mechanical support during manufacturing, it is not required for the optical functionality and may be removed. The waveguide 910 is formed vertically above and horizontally offset from the waveguide 920. In some other examples, the waveguide 910 are formed below the waveguide 920. A vertical distance between a bottom surface of the waveguide 910 and a top surface of the waveguide 920 is shown as "s1", and a horizontal distance between a left edge of the waveguide 910 and a left edge of the waveguide 920 is shown as "d1". In some embodiments, the waveguides 910 and 920 form an optical ring resonator, as described in further detail below.

Figure 10:
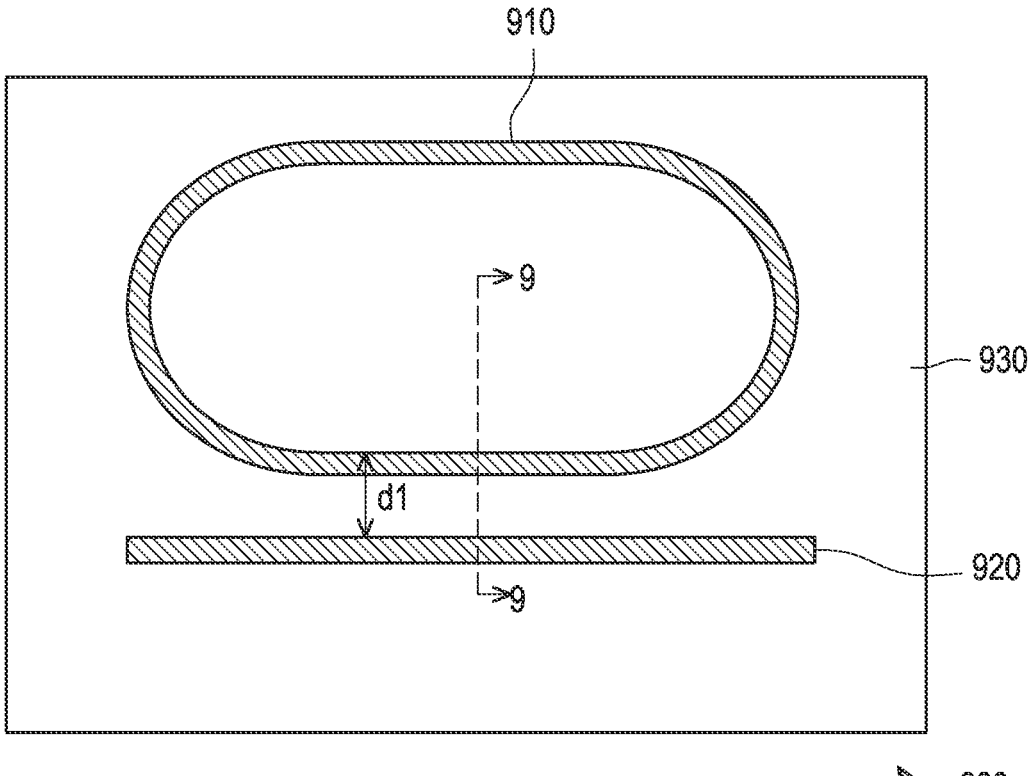
FIG. 10 illustrates a top-view of the photonic device illustrated in FIG. 9, according to an embodiment of the present disclosure.

FIG. 10 illustrates a top-view of the photonic device 900 illustrated in FIG. 9, according to an embodiment of the present disclosure. It should be noted that the cross sectional view illustrated in FIG. 9 is taken along dashed line 9-9 of FIG. 10. In one example, when a light source (not shown) is provided at a left edge of the waveguide 920, a first portion ($\alpha$) of the energy of the transmitted light is transmitted through the waveguide 920 to a right edge of the waveguide 920, while a remaining portion ($1-\alpha$) is optically coupled to the waveguide 910 and transmitted to the waveguide 910 through the silicon oxide layer 930. When the remaining portion ($1-\alpha$) is passed through a loop in the waveguide 910, it builds up in intensity over multiple round-trips due to constructive interference. The optical ring resonator formed by the waveguides 910 and 920 may be configured to function as a filter when only a few wavelengths are at resonance within the loop in the waveguide 910.

In some embodiments, the waveguides 910 and 920 comprise SiN waveguides. The SiN waveguides may be formed on multiple layers of the silicon oxide layer 930 formed over the SOI substrate 902 using LPCVD, PECVD, or any other deposition methods. The multiple layers of the silicon oxide layer 930 on which the SiN waveguides are formed may be considered as a single layer as illustrated by the silicon oxide layer 930 in FIG. 9, although the multiple layers of the silicon oxide layer 930 can be formed in different deposition steps. The LPCVD may use a FEOL high-temperature deposition process that requires a temperature of about 800° C., resulting in a stoichiometric silicon nitride such as $Si_3N_4$. In some examples, the PECVD is carried out at a temperature less than 400° C., and is thus typically a back end of line compatible process, but does not result in a stoichiometric silicon nitride. In some embodiments, the vertical distance between two vertically stacked SiN waveguides can be accurately formed through deposition, for example. As a result, optical ring resonators formed with two or more vertically stacked SiN waveguides may have improved performances as compared to optical ring resonators formed with waveguides from the same planar layer. In accordance with various embodiments, s1 can be in the range of 100 nanometers and 10 micrometers, and d1 can be in the range of zero and 1 millimeter.

Figure 11:
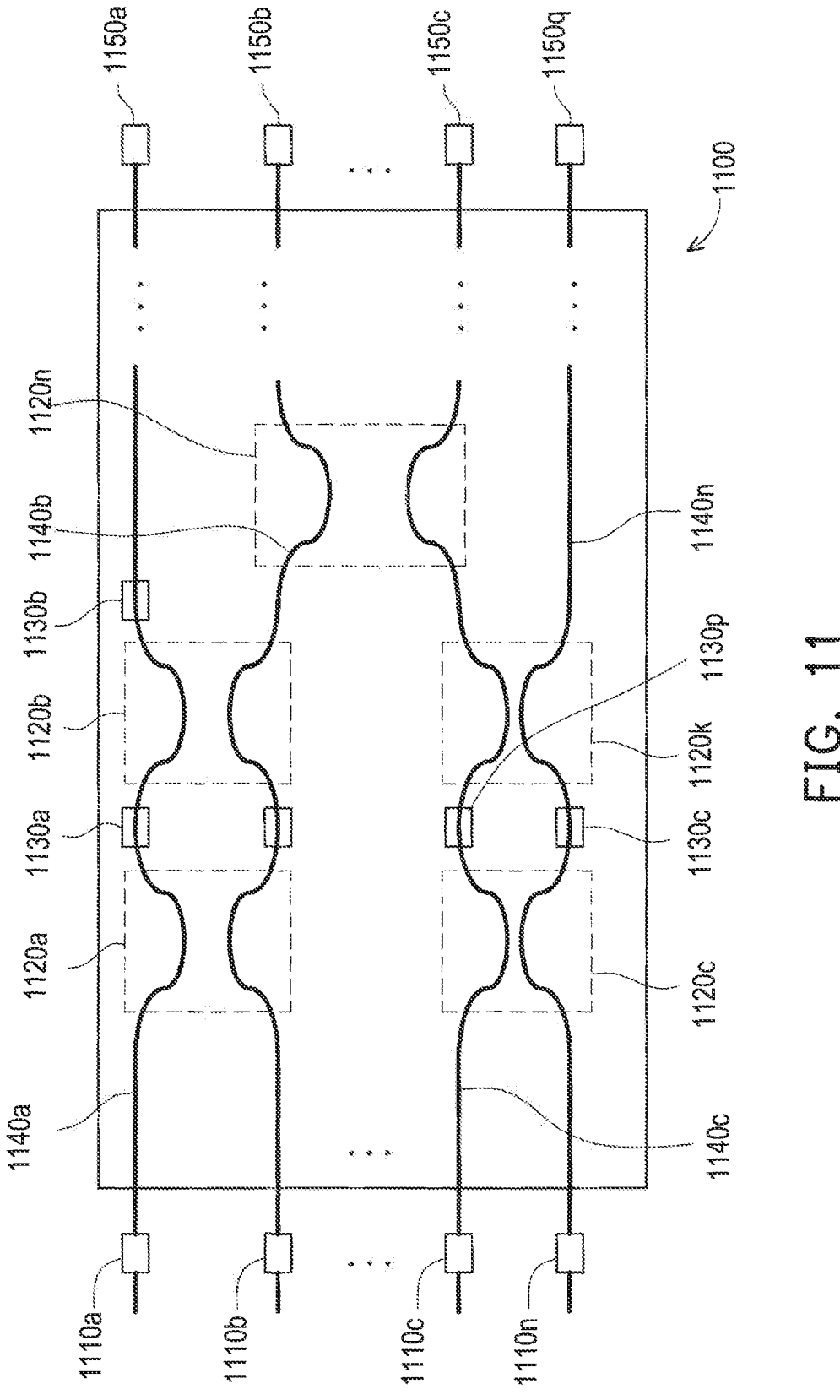
FIG. 11 illustrates a diagram of a photonic neural network device, according to an embodiment of the present disclosure.

FIG. 11 illustrates a diagram of a PNN device 1100, according to an embodiment of the present disclosure. As shown, in this embodiment, one or more optical modulators 1110a-n are placed at one or more inputs on a left side of the PNN device 1100. An optical modulator may be referred to as a device used to modulate a beam of light. Examples of an optical modulator include an amplitude modulator, a phase modulator, a polarization modulator, and/or any other types of optical modulators. In some examples, the one or more optical modulators 1110a-n take light sources as inputs and modulate the light sources to produce output optical signals encoded in the amplitude of optical pulses. The modulated light sources at the outputs of the one or more optical modulators 1110a-n may pass through one or more waveguides 1140a-1140n for further processing. The one or more waveguides 1140a-1140n may be SiN waveguides, Si waveguides, and/or any other types of waveguides.

In some embodiments, the one or more waveguides 1140a-1140n are formed at one or more vertically stacked waveguide layers in any of the photonic devices illustrated in FIG. 1-8. The one or more waveguides 1140a-1140n may be configured to form one or more optical DCs 1120a-1120k. In some examples, the one or more optical DCs 1120a-1120k are formed by waveguides at different vertical levels, as illustrated in various optical DCs in FIG. 1-8. As discussed above, any waveguide can form one or more optical DCs with one or more other waveguides. For example, as shown in FIG. 11, waveguide 1140b can form optical DC 1120b with waveguide 1140a, and another optical DC 1120n with waveguide 1140c. In further embodiments, the one or more optical DCs 1120a-1120k are combined with one or more phase shifters 1130a-1130p to provide matrix multiplication operation capability, as described in further detail below.

Figure 12:
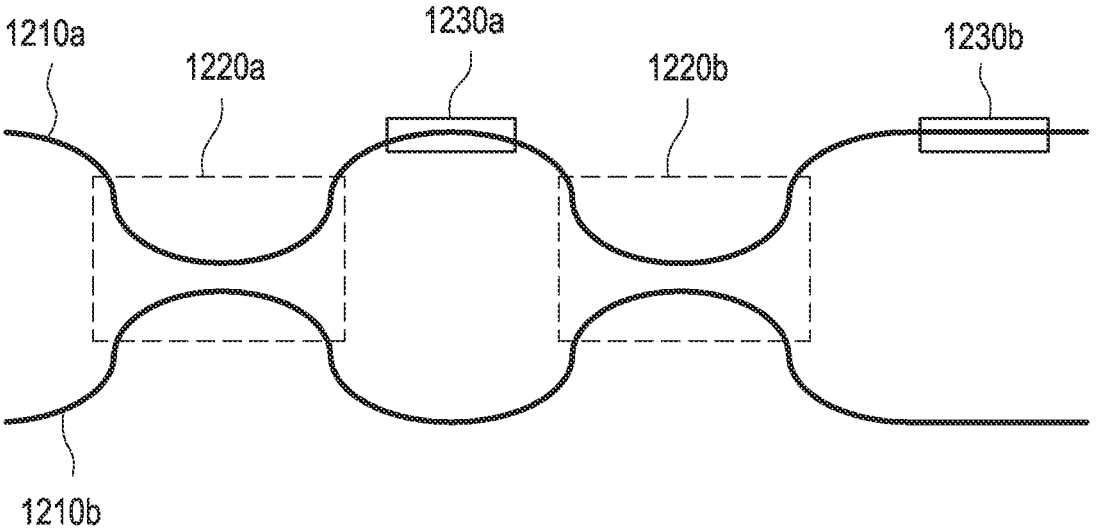
FIG. 12 illustrates an example implementation of a matrix multiplication in the photonic neural network device illustrated in FIG. 11, according to an embodiment of the present disclosure.

FIG. 12 illustrates an example implementation of a matrix multiplication in the PNN device 1100, according to an embodiment of the present disclosure. As shown, in this embodiment, two waveguides 1210a and 1210b are combined to form two optical DCs 1220a and 1220b. In some embodiments, the two waveguides 1210a and 1210b are at different vertical levels, as illustrated in various optical DCs in FIG. 1-8. In one example, the two optical DCs 1220a and 1220b are configured to have a power split ratio of 50/50, and the power split operation is denoted by B in the equation below. Two phase shifters 1230a and 1230b may be placed at the outputs of the two optical DCs 1220a and 1220b. The phase shift operations of the two phase shifters 1230a and 1230b may be denoted by $R_1$ and $R_2$. A unitary transformation U may be realized using the two optical DCs 1220a and 1220b and the two phase shifters 1230a and 1230b with the following equation: $U=R_1*B*R_2*B$. In another example, one or two phase shifters (not shown) are implemented at the inputs of the optical DC 1220a to provide 2×2 matrix multiplication.

Referring back to FIG. 11, one or more photodetectors 1150a-1150q may be configured to connect to one or more outputs at a right side of the PNN device 1100. A photodetector may be referred to as a device configured to sense input light and produce an output electronic signal corresponding to the input light. Examples of a photodetector include a photoemission-based photodetector, a thermal photodetector, a photochemical photodetector, and/or any other types of photodetectors. In some implementations, the one or more photodetectors 1150a-1150q are configured to implement one or more nonlinear output activation functions in a neural network. In one example, one or more nonlinear output activation functions $I_{out}=f(I_{in})$ are implemented at the one or more photodetectors 1150a-1150q, where $I_{in}$ denotes one or more inputs of the one or more photodetectors 1150a-1150q, and $I_{out}$ denotes one or more outputs of the one or more photodetectors 1150a-1150q. In some other implementations, the one or more outputs of the one or more photodetectors 1150a-1150q are connected to a next stage for further processing.

In some embodiments, the PNN device 1100 comprises an artificial neural network (ANN) model having n inputs arranged in an input vector o=($o_1$, . . . , $o_n$), k hidden layers, and m outputs. The output vector of the $1^{st}$ hidden layer is denoted by $o^{(1)}$ and may be computed using $o^{(1)}$=s(o\*$W_1$), where s is a nonlinear activation function and $W_1$ is a weight matrix connecting the input vector o to the $1^{st}$ hidden layer. In one example, the matrix multiplication o\*$W_1$ is implemented by the matrix multiplication implementation structure illustrated in FIG. 12 and the nonlinear activation function s is implemented by the one or more photodetectors 1150a-1150q. In the same way, the m outputs of the ANN may be denoted by an output vector $o^{(k+1)}$=($o_1$, . . . , $o_m$), and $o^{(k+1)}$ may be computed using $o^{(k+1)}$=s( . . . (s(s(o\*$W_1$)\* $W_2$)) . . . \*$W_{k+1}$), where $W_g$ (g<k) is a weight matrix connecting the (g–1)th hidden layer to the g-th hidden layer, and $W_k$ is a weight matrix connecting the k-th hidden to the output vector $o^{(k+1)}$. In some examples, all the matrix multiplication operations for computing the output vector $o^{(k+1)}$ are implemented by the matrix multiplication implementation structure illustrated in FIG. 12 and all the nonlinear activation functions for computing the outputs $o^{(k+1)}$ are implemented by the one or more photodetectors 1150a-1150q illustrated in FIG. 11.

Figure 13:
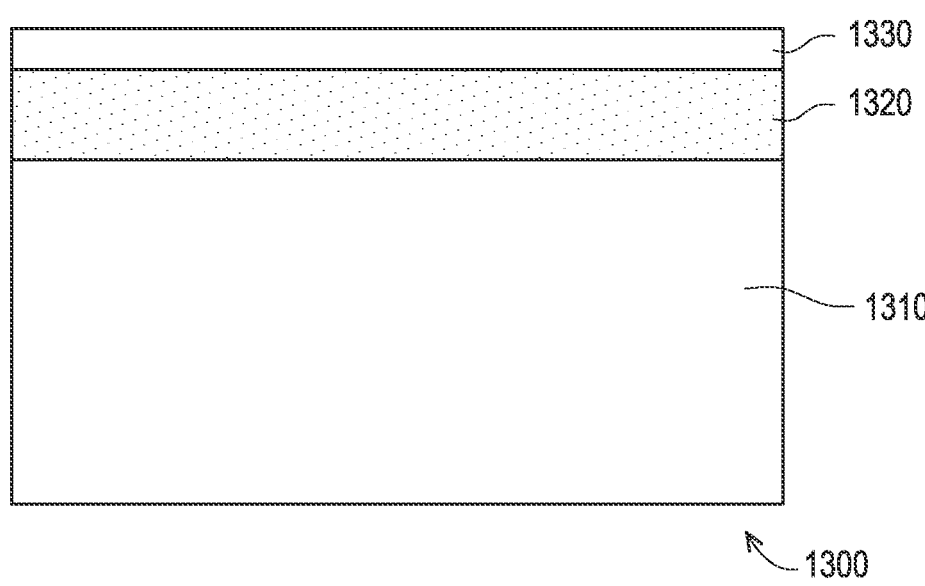
FIG. 13 illustrates a schematic sectional view of a silicon on insulator (SOI) substrate according to an embodiment of the present disclosure.

FIG. 13 through FIG. 20 depicts sequential steps of a method for forming vertically integrated photonic processing units, according to an embodiment of the present disclosure. FIG. 13 illustrates a cross-sectional side view of an SOI substrate 1300 according to an embodiment of the present disclosure. As shown, the SOI substrate 1300 comprises a Si layer 1330, an insulator layer 1320, and a Si substrate layer 1310, wherein the Si layer 1330 is formed over the insulator layer 1320, and the insulator layer 1320 is formed over the Si substrate layer 1310. The insulator layer 1320 may comprise $SiO_2$ and/or any other insulator materials.

Figure 14:
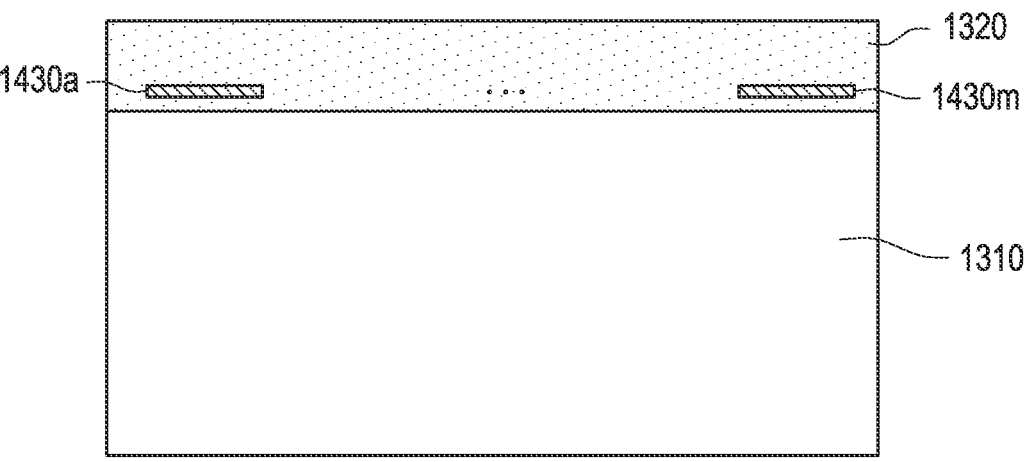
FIG. 14 illustrates a schematic sectional view of a device layout pattern formed in the SOI substrate of FIG. 13, according to an embodiment of the present disclosure.

FIG. 14 illustrates a cross-sectional side view of one or more layout patterns 1430a-1430m formed in the insulator layer 1320 illustrated in FIG. 13, according to an embodiment of the present disclosure. As shown, the Si layer 1330 is removed and the one or more layout patterns 1430a to 1430m are formed in the insulator layer 1320. Examples of the one or more layout patterns 1430a-1430m include active layer patterns, n-select layer patterns, p-select layer patterns, metal layer patterns, and/or any other layout patterns to form various types of integrated circuits.

Figure 15:
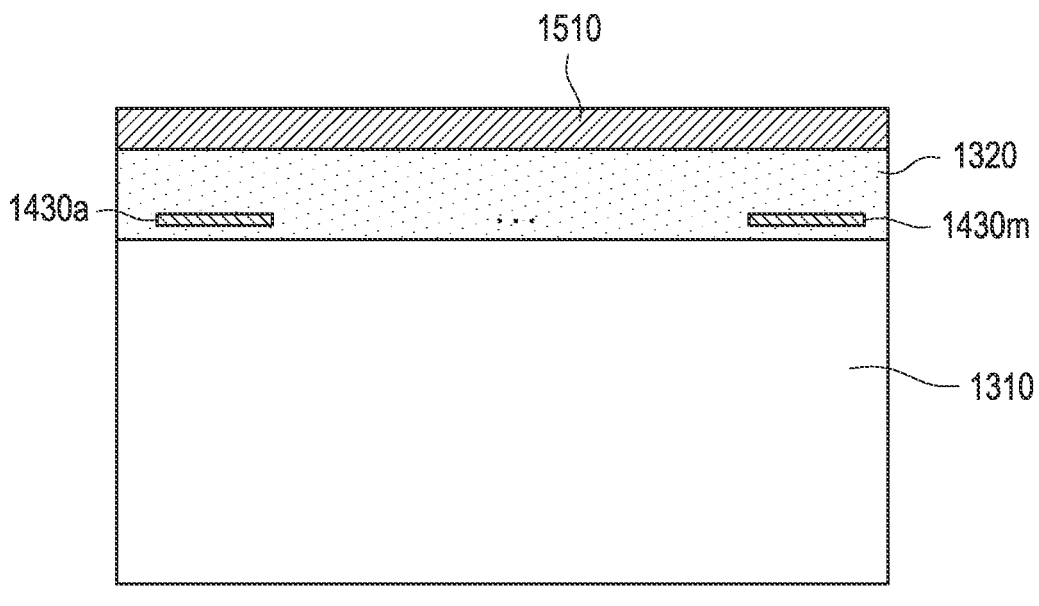
FIG. 15 illustrates a schematic sectional view of a waveguide layer formed on an insulator layer of FIG. 14, according to an embodiment of the present disclosure.
Figure 16:
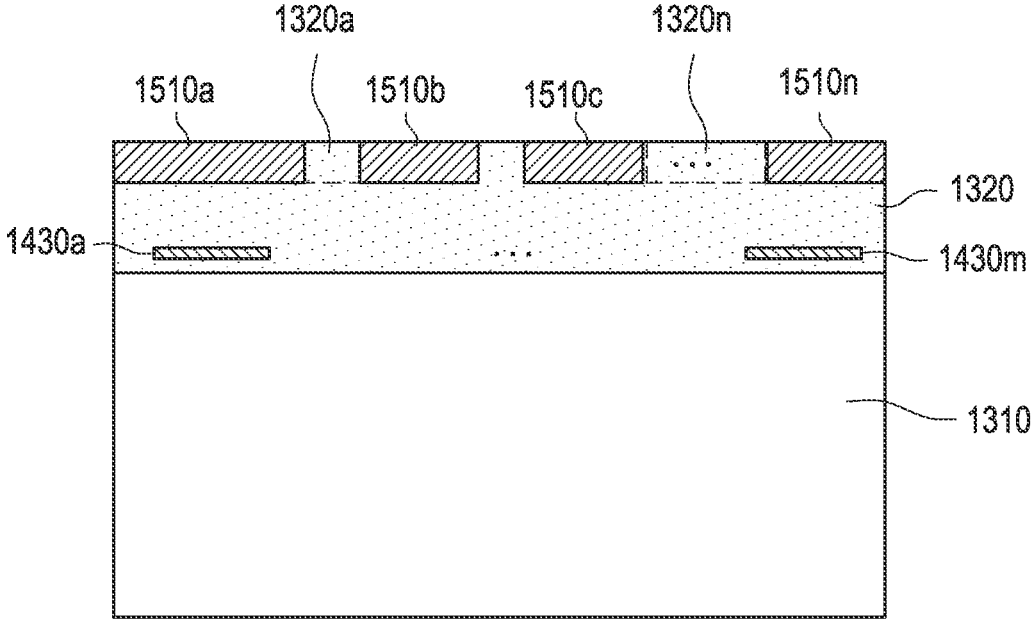
FIG. 16 illustrates a schematic sectional view of a first set of one or more waveguides formed on the insulator layer of FIG. 15, according to an embodiment of the present disclosure.

FIG. 15 illustrates a cross-sectional side view of a waveguide layer 1510 formed on the insulator layer 1320 illustrated in FIG. 14, according to an embodiment of the present disclosure. As shown, the waveguide layer 1510 may be deposited on the insulator layer 1320. The waveguide layer 1510 may be a SiN layer, a Si layer, and/or any other types of waveguide layers. In one example, the waveguide layer 1510 is deposited using LPCVD carried out at a temperature of about 800° C. In another example, the waveguide layer 1510 is deposited using PECVD carried out at a temperature less than 400° C. In some embodiments, an insulator spacer (not shown) comprising the same material as the insulator layer 1320 is deposited on the insulator layer 1320 before deposition of the waveguide layer 1510 to increase the vertical distance between the waveguide layer 1510 and the one or more layout patterns 1430a to 1430m for better isolation. The insulator layer 1320 and the insulator spacer may be considered as a single layer as illustrated by the insulator layer 1320 in FIG. 15, FIG. 16 illustrates a cross-sectional side view of one or more waveguides 1510a-1510n formed on the insulator layer 1320 of FIG. 15 according to an embodiment of the present disclosure. The one or more waveguides 1510a to 1510n may be formed by performing an etching process at the waveguide layer 1510 illustrated in FIG. 15 based on one or more predetermined waveguide patterns. Examples of the one or more predetermined waveguide patterns include optical DC patterns, optical ring resonator patterns, optical beam splitter patterns, and/or any other types of waveguide patterns. In some embodiments, a first set of one or more insulator spacers 1320a-1320n comprising the same material as the insulator layer 1320 are deposited between side surfaces of the one or more waveguides 1510a-1510n to horizontally isolate the one or more waveguides 1510a-1510n. In some other embodiments, a second set of one or more insulator spacers (not shown) comprising the same material as the insulator layer 1320 are deposited vertically above the one or more waveguides 1510a to 1510n and the first set of one or more insulator spacers to vertically isolate the one or more waveguides 1510a-n from other layers deposited on the one or more waveguides 1510a-n in a later process. The insulator layer 1320, the first set of one or more insulator spacers, and the second set of one or more insulator spacers may be considered as a single layer and presented as the insulator layer 1320.

Figure 17:
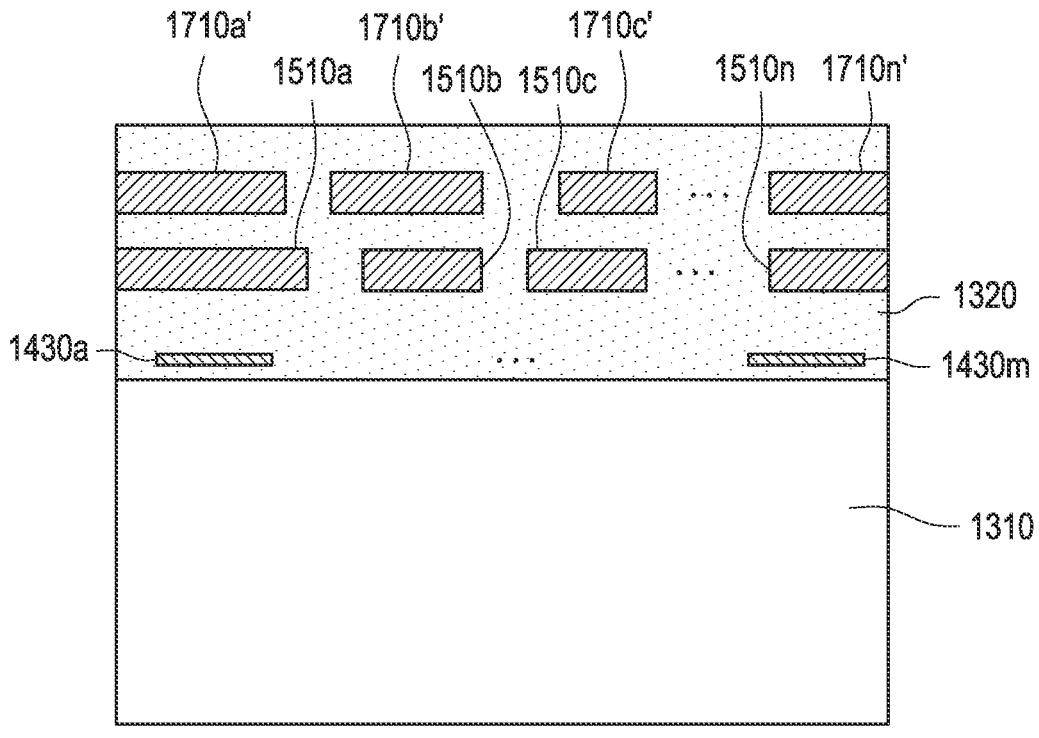
FIG. 17 illustrates a schematic sectional view of an additional set of one or more additional waveguides formed above the first set of one or more waveguides of FIG. 16 according to an embodiment of the present disclosure.

FIG. 17 illustrates a cross-sectional side view of one or more waveguides 1710a'-1710n' formed vertically above the one or more waveguides 1510a-1510n, according to an embodiment of the present disclosure. The one or more waveguides 1710a'-1710n' may be formed by first depositing a waveguide layer and then performing an etching process at the waveguide layer based on predetermined waveguide patterns. In some embodiments, a first set of one or more insulator spacers comprising the same material as the insulator layer 1320 are deposited between side surfaces of the one or more waveguides 1710a'-1710n' to horizontally isolate the one or more waveguides 1710a'-1710n'. In some other embodiments, a second set of one or more insulator spacers comprising the same material as the insulator layer 1320 are deposited vertically above the one or more waveguides 1710a'-1710n' and the first set of one or more insulator spacers to vertically isolate the one or more waveguides 1710a'-1710n' from other layers deposited on the one or more waveguides 1710a'-1710n' in a later process. The insulator layer 1320, the first set of one or more insulator spacers, and the second set of one or more insulator spacers may be considered as a single layer and presented as the insulator layer 1320.

Figure 18:
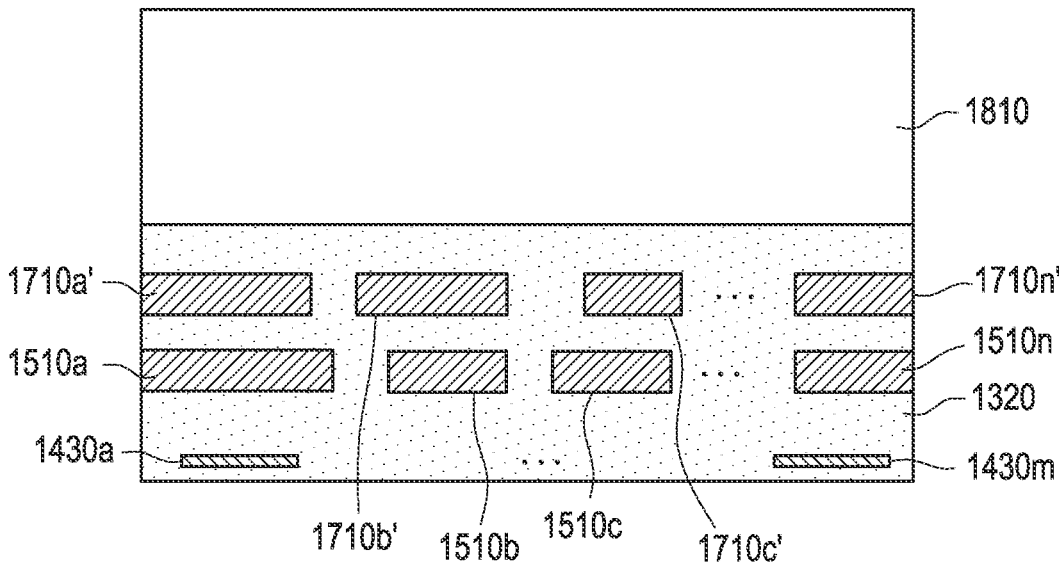
FIG. 18 illustrates a schematic sectional view of a handling wafer layer formed above the additional set of one or more waveguides of FIG. 17, according to an embodiment of the present disclosure.

FIG. 18 illustrates a cross-sectional side view of a handling wafer layer 1810 formed above the insulator layer 1320 illustrated in FIG. 17, according to an embodiment of the present disclosure. The handling wafer layer 1810 may be referred to as a layer used as a foundation for the construction of components vertically below the handling wafer layer 1810. Examples of the handling wafer layer 1810 include a Si substrate, a Si thermal oxide wafer, a $SiO_2$ thermal oxide wafer, and/or any other types of handling wafers.

In one example, the Si substrate layer 1310 is removed before formation of the handling wafer layer 1810 such that additional layers can be formed vertically below the one or more layout patterns 1430a to 1430m. In another example, the handling wafer layer 1810 is formed vertically above a set of one or more insulator spacers deposited on the one or more waveguides 1710a'-1710n'. The insulator layer 1320 and the set of one or more insulator spacers may be considered as a single layer and presented as the insulator layer 1320. In still another example, the Si substrate layer 1310 is removed and the handling wafer layer 1810 is formed if it is determined that additional waveguide layers need to be formed vertically below the one or more layout patterns 1430a to 1430m.

Figure 19:
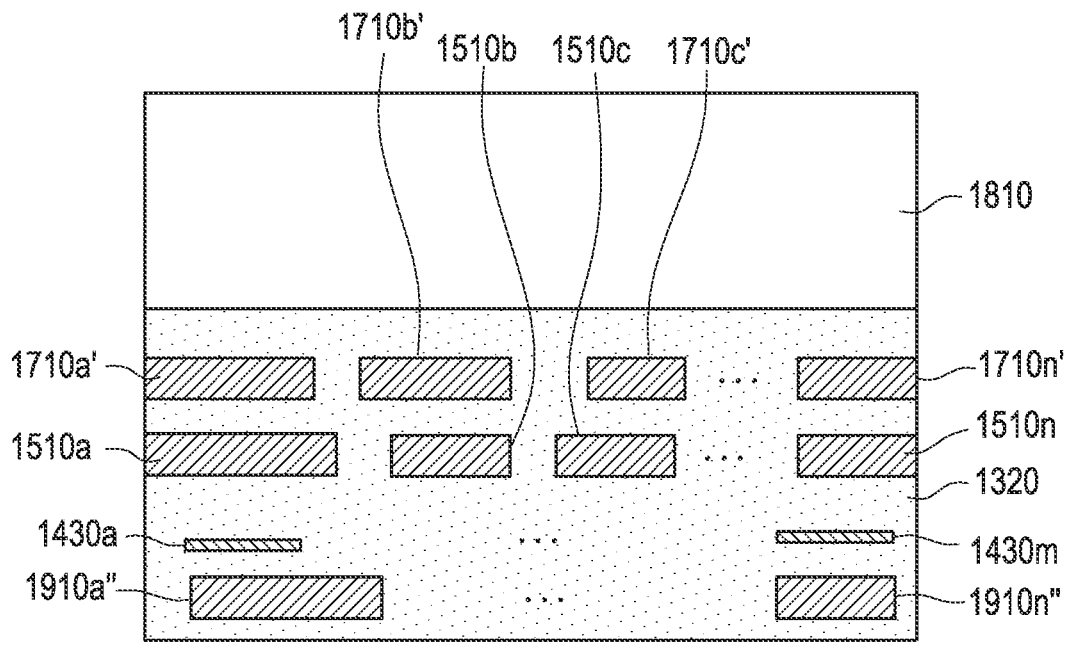
FIG. 19 illustrates a schematic sectional view of a second set of one or more waveguides formed vertically below the device layout pattern of FIG. 14, according to an embodiment of the present disclosure.

FIG. 19 illustrates a cross-sectional side view of one or more waveguides 1910a"-1910n" formed vertically below the insulator layer 1320, according to an embodiment of the present disclosure. The one or more waveguides 1910a" to 1910n" may be formed by first depositing a waveguide layer and then performing an etching process at the waveguide layer based on predetermined waveguide patterns. In some embodiments, a first set of one or more insulator spacers comprising the same material as the insulator layer 1320 are deposited between side surfaces of the one or more waveguides 1910a"-1910n" to horizontally isolate the one or more waveguides 1910a"-1910n". In some other embodiments, a second set of one or more insulator spacers comprising the same material as the insulator layer 1320 are deposited vertically below the one or more waveguides 1910a"-n" to vertically isolate the one or more waveguides 1910a"-n" from other layers deposited below the one or more waveguides 1910a"-n" and the first set of one or more insulator spacers in a later process. The insulator layer 1320, the first set of one or more insulator spacers, and the second set of one or more insulator spacers may be considered as a single layer and presented as the insulator layer 1320 in FIG. 19.

Figure 20:
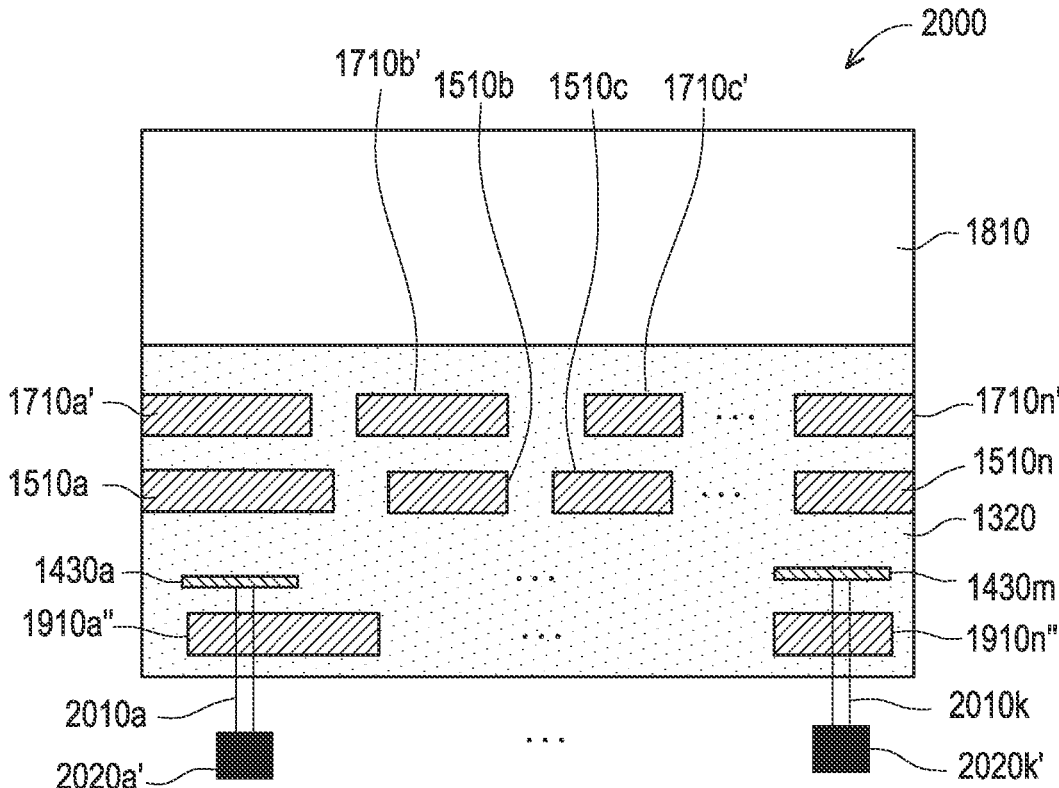
FIG. 20 illustrates a schematic sectional view of one or more vias formed to connect the device layout pattern of FIG. 19 to one or more pads, according to an embodiment of the present disclosure.

FIG. 20 illustrates a cross-sectional side view of a computing system 2000 according to an embodiment of the present disclosure. In some embodiments, one or more vias 2010a to 2010k are formed in the computing system 2000 to connect the one or more layout patterns 1430a-1430m illustrated in FIG. 19 to one or more pads 2020a'-2020k'. The one or more vias 2010a-2010k may be referred to as small openings in the insulator layer 1320 used to create a conductive connection between the one or more layout patterns 1430a-1430m and the one or more pads 2020a'-2020k'. Examples of the one or more vias 2010-2010k include through-chip vias, through-silicon vias, and/or any other types of vias. The one or more pads 2020a'-2020k' may be referred to as designated surface areas used to interface with external circuitry. Examples of the one or more pads 2020a'-2020k' include gold contact pads, copper contact pads, and/or any other types of pads.

In some embodiments, the waveguides 1510a-1510n, 1710a'-1710n', and 1910a"-1910n" are configured to form a plurality of optical DCs as illustrated in various optical DCs in FIG. 1-8. The one or more layout patterns 1430a-1430m may be configured to form a set of components such as optical modulators, photodetectors, and/or any other components. The plurality of optical DCs and the set of components may be configured to implement various devices in the computing system 2000 such as the PNN device illustrated in FIG. 11. In some embodiments, the inputs and outputs of the computing system 2000 are accessed at the one or more pads 2020a'-2020k'.

Figure 21:
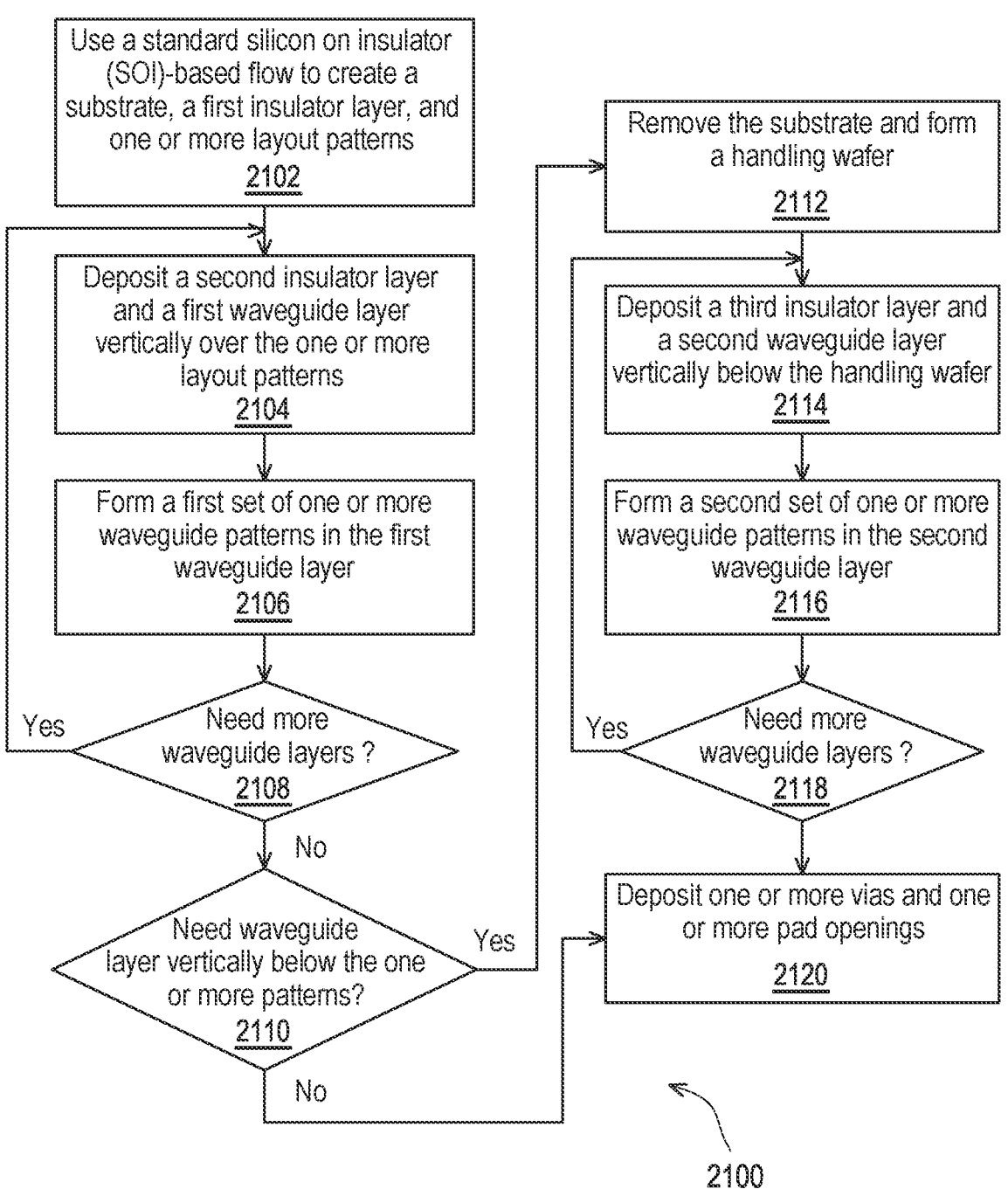
FIG. 21 illustrates an example method for forming a photonic device.

FIG. 21 illustrates an example method 2100 for forming a photonic device according to an embodiment of the present disclosure. The operations of the method 2100 presented below are intended to be illustrative. In some embodiments, the method 2100 may be accomplished with one or more additional operations not described and/or without one or more of the operations discussed. Additionally, the order in which the operations of the method 2100 are illustrated in FIG. 21 and described below is not intended to be limiting.

At step 2102, a standard SOI-based flow is used to create a substrate, a first insulator layer, and one or more layout patterns. In some embodiments, the substrate comprises a silicon substrate built to reduce parasitic capacitance and improve device performance. In some other embodiments, the first insulator layer comprises a $SiO_2$ layer used to isolate the one or more layout patterns and the substrate. In still some other embodiments, the one or more layout patterns comprise one or more active layer patterns, n-select layer patterns, p-select layer patterns, metal layer patterns, and/or any other patterns to form a predetermined device layout. In yet some other embodiments, the first insulator layer is deposited to create isolation among the one or more layout patterns.

At step 2104, a second insulator layer and a first waveguide layer are deposited vertically over the one or more layout patterns. In one example, the second insulator layer is deposited between the first waveguide layer and the one or more layout patterns to create isolation between the first waveguide layer and the one or more layout patterns. In another example, the first waveguide layer comprises a SiN layer formed using LPCVD. In still another example, the first waveguide layer comprises a SiN layer formed using PECVD.

At step 2106, a first set of one or more waveguide patterns are formed at the first waveguide layer. In some embodiments, the first set of one or more waveguide patterns correspond to predetermined waveguide patterns used to implement one or more optical components such as DCs, splitters, optical attenuators, isolators, filters, switches, optical multiplexers, and/or any other components. In some other embodiments, one or more insulator spacers comprising the same material as the first insulator layer are formed to isolate side surfaces of the one or more optical components in the first set of one or more waveguide patterns.

At step 2108, the method 2100 checks whether more waveguide layers are needed to be deposited vertically over the first waveguide layer deposited at step 2104. If more waveguide layers are needed to be deposited, then go back to step 2104 to start depositing another insulator layer and waveguide layer. If no more waveguide layers are needed to be deposited, then go to step 2110.

At step 2110, the method 2100 checks whether more waveguide layers are needed vertically below the one or more layout patterns. If more waveguide layers are needed vertically below the one or more layout patterns, then go to step 2112. If no more waveguide layers are needed vertically below the one or more layout patterns, then go to step 2120.

At step 2112, a handling wafer is formed and the substrate is removed. In some embodiments, the handling wafer is a Si substrate formed vertically over an insulator layer formed deposited the first set of one or more waveguide patterns formed at step 2106.

At step 2114, a third insulator layer and a second waveguide layer are deposited vertically below the one or more layout patterns formed at step 2102. In one example, the third insulator layer is deposited between the second waveguide layer and the one or more layout patterns to create isolation between the second waveguide layer and the one or more layout patterns. In another example, the second waveguide layer comprises a SiN layer formed using LPCVD. In still another example, the second waveguide layer comprises a SiN layer formed using PECVD.

At step 2116, a second set of one or more waveguide patterns are formed at the second waveguide layer. In some embodiments, the second set of one or more waveguide patterns correspond to predetermined waveguide patterns used to implement one or more optical components such as DCs, splitters, optical attenuators, isolators, filters, switches, optical multiplexers, and/or any other components. In some other embodiments, one or more insulator spacers comprise the same material as the third insulator layer and are formed to isolate side surfaces of the one or more optical components in the second set of one or more waveguide patterns.

At step 2118, the method 2100 checks whether more waveguide layers are needed to be deposited vertically below the second waveguide layer deposited at step 2114. If more waveguide layers are needed to be deposited, then go back to step 2114 to start depositing another insulator layer and waveguide layer. If no more waveguide layers are needed to be deposited, then go to step 2120.

At step 2120, one or more vias and one or more pad openings are deposited. In some embodiments, the one or more vias connect the one or more layout patterns to the one or more pad openings, and the one or more pad openings are used to interface with external circuitry.

Figure 22:
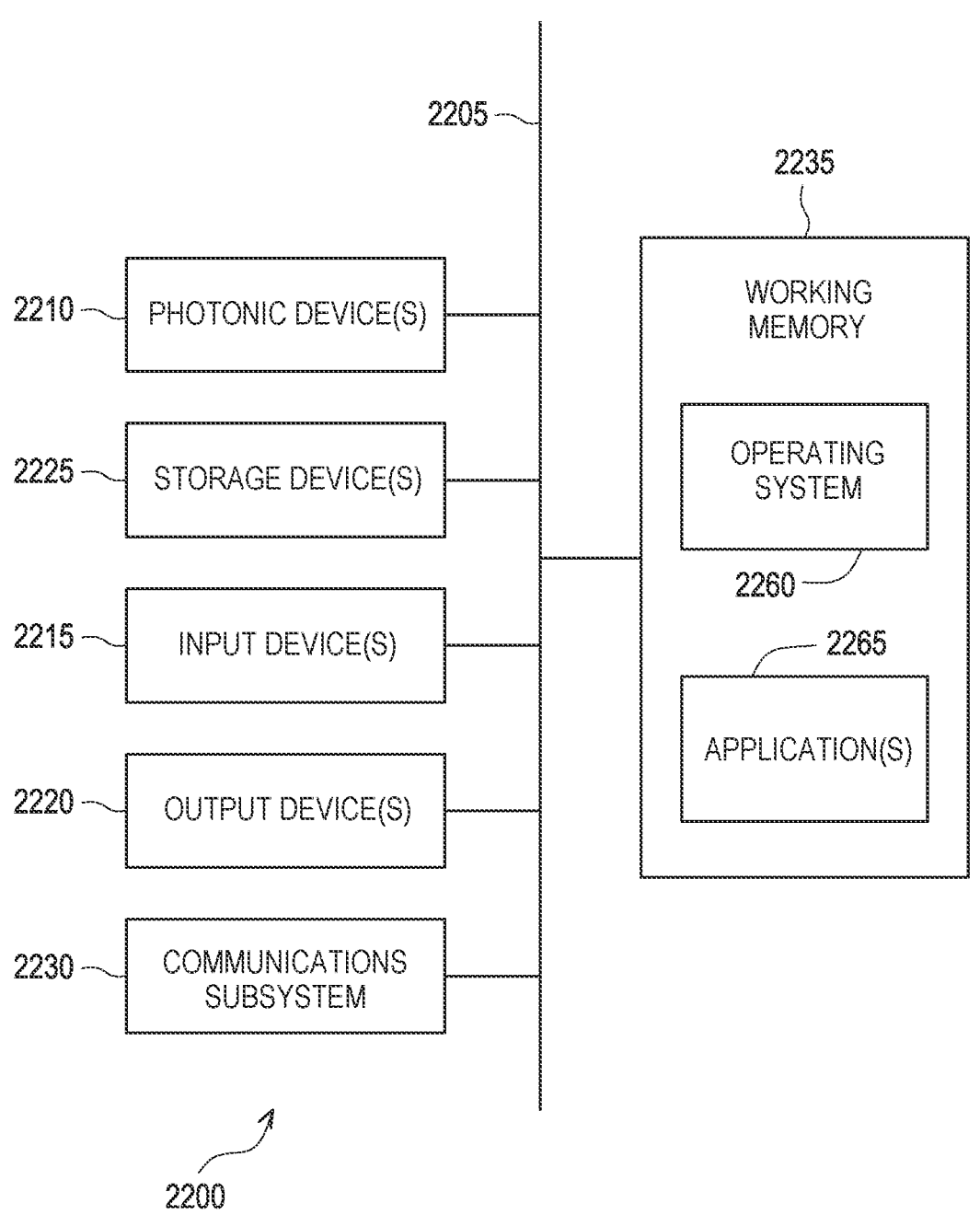
FIG. 22 illustrates a simplified computer system that can be used to implement various embodiments described and illustrated in the present disclosure.

FIG. 22 illustrates a computer system 2200 according to an embodiment of the present disclosure. The computer system 2200 as illustrated in FIG. 22 may be incorporated into devices such as a portable electronic device, mobile phone, or other device as described herein. The computer system 2200 is shown comprising hardware elements that can be electrically coupled via a bus 2205, or may otherwise be in communication, as appropriate. The hardware elements may include one or more photonic devices 2210; one or more input devices 2215, which can include without limitation a mouse, a keyboard, a camera, and/or the like; and one or more output devices 2220, which can include without limitation a display device, a printer, and/or the like.

In one embodiment, the one or more photonic devices 2210 comprise one or more PNN devices as illustrated in FIG. 11 to provide central processing operations in the computer system 2200. Examples of the one or more PNN devices include neural processors, deep neural networks, convolutional neural networks, and/or any other types of PNN devices.

The computer system 2200 may further include and/or be in communication with one or more non-transitory storage devices 2225, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 2200 might also include a communications subsystem 2230, which can include without limitation a modem, a network card (wireless or wired), an infrared communication device, a wireless communication device, and/or a chipset such as a Bluetooth™ device, an 1002.11 device, a WiFi device, a WiMax device, cellular communication facilities, etc., and/or the like. The communications subsystem 2230 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 2230. In other embodiments, a portable electronic device, e.g. the first electronic device, may be incorporated into the computer system 2200, e.g., an electronic device as an input device 2215. In some embodiments, the computer system 2200 will further comprise a working memory 2235, which can include a RAM or ROM device, as described above.

The computer system 2200 also can include software elements, shown as being currently located within the working memory 2235, including an operating system 2260, device drivers, executable libraries, and/or other code, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 21, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 2225 described above. In some cases, the storage medium might be incorporated within a computer system, such as computer system 2200. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 2200 and/or might take the form of source and/or installable code, which, upon compilation and/or installation on the computer system 2200 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 2200 to perform methods in accordance with various embodiments of the technology. According to a set of embodiments, some or all of the procedures of such methods are performed by the computer system 2200 in response to the one or more photonic devices 2210 executing one or more sequences of one or more instructions, which might be incorporated into the operating system 2260 and/or other code contained in the working memory 2235. Such instructions may be read into the working memory 2235 from another computer-readable medium, such as one or more of the storage device(s) 2225. Merely by way of example, execution of the sequences of instructions contained in the working memory 2235 might cause the one or more photonic devices 2210 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 2200, various computer-readable media might be involved in providing instructions/code to the one or more photonic devices 2210 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 2225. Volatile media include, without limitation, dynamic memory, such as the working memory 2235.

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the one or more photonic devices 2210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 2200.

The communications subsystem 2230 and/or components thereof generally will receive signals, and the bus 2205 then might carry the signals and/or the data, instructions, etc. carried by the signals to the working memory 2235, from which the one or more photonic devices 2210 retrieves and executes the instructions. The instructions received by the working memory 2235 may optionally be stored on a non-transitory storage device 2225 either before or after execution by the one or more photonic devices 2210.

In accordance with some embodiments, a method for forming a photonic device, includes: providing a substrate; forming a first insulator layer over the substrate; depositing a first plurality of waveguide layers and a first plurality of insulator spacers at different vertical levels over the first insulator layer, wherein adjacent waveguide layers in the first plurality of waveguide layers are isolated by one or more insulator spacers in the first plurality of insulator spacers; and forming a first plurality of waveguide patterns at the first plurality of waveguide layers, wherein at least two waveguide patterns at different vertical levels in the first plurality of waveguide patterns are coupled. In some embodiments, the method further includes: removing the substrate; forming a second insulator layer over the first plurality of waveguide patterns; forming a handling wafer over the second insulator layer; depositing a second plurality of waveguide layers and a second plurality of insulator spacers at different vertical levels under the first insulator layer, wherein adjacent waveguide layers in the second plurality of waveguide layers are isolated by one or more insulator spacers in the second plurality of insulator spacers; and forming a second plurality of waveguide patterns at the second plurality of waveguide layers, wherein at least two waveguide patterns at different vertical levels in the second plurality of waveguide patterns are coupled. In further embodiments, the first plurality of waveguide layers and the second plurality of waveguide layers are deposited by low-pressure chemical vapor deposition (LPCVD) or plasma-enhanced chemical vapor deposition (PECVD). In some embodiments, the at least two waveguide patterns at different vertical levels in the first plurality of waveguide patterns are coupled to form a directional coupler or a ring resonator, wherein at least one performance parameter of the directional coupler or the ring resonator is determined by a vertical distance between the at least two waveguide patterns at different vertical levels in the first plurality of waveguide patterns. In some embodiments, the at least two waveguide patterns at different vertical levels in the second plurality of waveguide patterns are coupled to form a directional coupler or a ring resonator, wherein at least one performance parameter of the directional coupler or the ring resonator is determined by a vertical distance between the at least two waveguide patterns at different vertical levels in the second plurality of waveguide patterns. In some embodiments, the substrate is a silicon-on-insulator (SOI) substrate. In further embodiments, the first plurality of waveguide layers comprises silicon nitride layers. In some embodiments, the second plurality of waveguide layers comprises silicon nitride layers and the handling wafer comprises a silicon substrate. In further embodiments, the first plurality of waveguide patterns comprises one or more photonic neural networks. In some embodiments, the second plurality of waveguide patterns comprises one or more photonic neural networks.

In accordance with further embodiments, a photonic device includes: a substrate; a first insulator layer over the substrate; a first plurality of waveguide layers and a first plurality of insulator spacers deposited at different vertical levels over the first insulator layer, wherein adjacent waveguide layers in the first plurality of waveguide layers are isolated by one or more insulator spacers in the first plurality of insulator spacers; and a first plurality of waveguide patterns formed at the first plurality of waveguide layers, wherein at least two waveguide patterns at different vertical levels in the first plurality of waveguide patterns are coupled. In some embodiments, the photonic device further includes: a second insulator layer over the first plurality of waveguide patterns; a handling wafer over the second insulator layer; a second plurality of waveguide layers and a second plurality of insulator spacers deposited at different vertical levels under the first insulator layer, wherein adjacent waveguide layers in the second plurality of waveguide layers are isolated by one or more insulator spacers in the second plurality of insulator spacers; and a second plurality of waveguide patterns formed at the second plurality of waveguide layers, wherein at least two waveguide patterns at different vertical levels in the second plurality of waveguide patterns are coupled. In some embodiments, the at least two waveguide patterns at different vertical levels in the first plurality of waveguide patterns are coupled to form a directional coupler or a ring resonator, wherein at least one performance parameter of the directional coupler or the ring resonator is determined by a vertical distance between the at least two waveguide patterns at different vertical levels in the first plurality of waveguide patterns. In further embodiments, the first plurality of waveguide layers comprises silicon nitride layers and the second plurality of waveguide layers comprises silicon nitride layers. In some embodiment, the first plurality of waveguide patterns comprises one or more photonic neural networks.

In alternative embodiments, a computing system is disclosed, wherein the computing system includes one or more layout patterns; and at least one photonic device coupled to the one or more layout patterns by one or more vias, wherein the at least one photonic device includes: one or more photonic devices, wherein at least one of the one or more photonic devices includes: a substrate; a first insulator layer over the substrate; a first plurality of waveguide layers and a first plurality of insulator spacers deposited at different vertical levels over the first insulator layer, wherein adjacent waveguide layers in the first plurality of waveguide layers are isolated by one or more insulator spacers in the first plurality of insulator spacers; and a first plurality of waveguide patterns formed at the first plurality of waveguide layers, wherein at least two waveguide patterns at different vertical levels in the first plurality of waveguide patterns are coupled. In some embodiments, the at least one of the one or more photonic devices further includes: a second insulator layer over the first plurality of waveguide patterns; a handling wafer over the second insulator layer; a second plurality of waveguide layers and a second plurality of insulator spacers deposited at different vertical levels under the first insulator layer, wherein adjacent waveguide layers in the second plurality of waveguide layers are isolated by one or more insulator spacers in the second plurality of insulator spacers; and a second plurality of waveguide patterns formed at the second plurality of waveguide layers, wherein at least two waveguide patterns at different vertical levels in the second plurality of waveguide patterns are coupled. In further embodiment, the at least two waveguide patterns at different vertical levels in the first plurality of waveguide patterns are coupled to form a directional coupler or a ring resonator, wherein at least one performance parameter of the directional coupler or the ring resonator is determined by a vertical distance between the at least two waveguide patterns at different vertical levels in the first plurality of waveguide patterns. In some embodiments, the first plurality of waveguide layers comprises silicon nitride layers.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for forming a photonic device,
the method comprising:
    providing a substrate;
    forming a first insulator layer over the substrate;
    depositing at least one first waveguide layer over the first insulator layer;
    forming a first plurality of waveguide patterns in the at least one first waveguide layer, wherein at least two waveguide patterns at different vertical levels in the first plurality of waveguide patterns are optically coupled to each other;
    removing the substrate;
    forming at least one second waveguide layer under the first insulator layer after removing the substrate; and forming a second plurality of waveguide patterns in the at least one second waveguide layer, wherein at least two waveguide patterns at different vertical levels in the second plurality of waveguide patterns are optically coupled to each other.

2. The method of claim 1, wherein the at least one first waveguide layer comprises a same material as the at least one second waveguide layer.

3. The method of claim 1, wherein the at least one first waveguide layer and the at least one second waveguide layer are each deposited by low-pressure chemical vapor deposition (LPCVD) or plasma-enhanced chemical vapor deposition (PECVD).

4. The method of claim 1, wherein the at least two waveguide patterns at different vertical levels in the first plurality of waveguide patterns are coupled to form a directional coupler or a ring resonator, wherein at least one performance parameter of the directional coupler or the ring resonator is determined by a vertical distance between the at least two waveguide patterns at different vertical levels in the first plurality of waveguide patterns.

5. The method of claim 1, wherein the at least two waveguide patterns at different vertical levels in the second plurality of waveguide patterns are coupled to form a directional coupler or a ring resonator, wherein at least one performance parameter of the directional coupler or the ring resonator is determined by a vertical distance between the at least two waveguide patterns at different vertical levels in the second plurality of waveguide patterns.

6. The method of claim 1, wherein the substrate is a silicon-on-insulator (SOI) substrate.

7. The method of claim 1, wherein the at least one first waveguide layer comprises silicon nitride layers.

8. The method of claim 1, wherein the at least one second waveguide layer comprises silicon nitride layers.

9. The method of claim 1, wherein the first plurality of waveguide patterns comprises a first photonic neural network and the second plurality of waveguide patterns comprises a second photonic neural network.

10. The method of claim 1, further comprising:
    forming a second insulator layer over the first plurality of waveguide patterns;
    forming a handling wafer over the second insulator layer.

11. A photonic device, comprising:
    a first insulator layer;
    at least one first waveguide layer formed over the first insulator layer;
    a first plurality of waveguide patterns formed in the at least one first waveguide layer, wherein at least two waveguide patterns at different vertical levels in the first plurality of waveguide patterns are optically coupled to each other;
    a handling wafer over the first insulator layer;
    at least one second waveguide layer formed under the first insulator layer; and
    a second plurality of waveguide patterns formed in the at least one second waveguide layer, wherein at least two waveguide patterns at different vertical levels in the second plurality of waveguide patterns are optically coupled to each other,
    wherein the first plurality of waveguide patterns comprises one or more photonic neural networks.

12. The photonic device of claim 11, wherein the at least one first waveguide layer comprises a same material as the at least one second waveguide layer.

13. The photonic device of claim 11, wherein the at least two waveguide patterns at different vertical levels in the first plurality of waveguide patterns are coupled to form a directional coupler or a ring resonator, wherein at least one performance parameter of the directional coupler or the ring resonator is determined by a vertical distance between the at least two waveguide patterns at different vertical levels in the first plurality of waveguide patterns.

14. The photonic device of claim 11, wherein the at least one first waveguide layer comprises silicon nitride layers.

15. The photonic device of claim 11, wherein the at least one second waveguide layer comprises silicon nitride layers.

16. The photonic device of claim 11, wherein the second plurality of waveguide patterns is part of the one or more photonic neural networks.

17. An integrated circuit (IC), comprising:
one or more layout patterns; and
at least one photonic device coupled to the one or more layout patterns by one or more vias, wherein the at least one photonic device comprises:
a first insulator layer;
at least one first waveguide layer formed over the first insulator layer;
a first plurality of waveguide patterns formed in the at least one first waveguide layer, wherein at least two waveguide patterns at different vertical levels in the first plurality of waveguide patterns are optically coupled to each other;
a handling wafer over the first insulator layer;
at least one second waveguide layer formed under the first insulator layer; and
a second plurality of waveguide patterns formed in the at least one second waveguide layer, wherein at least two waveguide patterns at different vertical levels in the second plurality of waveguide patterns are optically coupled to each other,
wherein the one or more layout patterns, the one or more vias, and the at least one photonic device form a photonic neural network (PNN) device.

18. The IC of claim 17, wherein the at least one first waveguide layer comprises a same material as the at least one second waveguide layer.

19. The IC of claim 17, wherein the at least one photonic device further comprises at least one optical modulator.

20. The IC of claim 17, wherein the at least one first waveguide layer comprises a first plurality of waveguide layers, and the at least one second waveguide layer comprises a second plurality of waveguide layers.

\* \* \* \* \*